US011041555B2

(12) United States Patent
Velayudham et al.

(10) Patent No.: US 11,041,555 B2
(45) Date of Patent: Jun. 22, 2021

(54) SEALED PISTON APPARATUS AND RELATED SYSTEMS FOR USE WITH VEHICLE TORQUE CONVERTERS

(71) Applicant: VALEO KAPEC CO., LTD., Daegu (KR)

(72) Inventors: Vijayakumar Velayudham, Auburn Hills, MI (US); Sungchul Lee, Auburn Hills, MI (US); Subramanian Jeyabalan, Daegu (KR); Xuexian Yin, Auburn Hills, MI (US)

(73) Assignee: VALEO KAPEC CO., LTD., Daegu (KR)

( * ) Notice: Subject to any disclaimer, the term of this patent is extended or adjusted under 35 U.S.C. 154(b) by 0 days.

(21) Appl. No.: 16/590,445

(22) Filed: Oct. 2, 2019

(65) Prior Publication Data

US 2021/0102585 A1   Apr. 8, 2021

(51) Int. Cl.
*F16H 45/02* (2006.01)
*F16D 31/02* (2006.01)
*F16D 31/08* (2006.01)

(52) U.S. Cl.
CPC ............ *F16H 45/02* (2013.01); *F16D 31/02* (2013.01); *F16D 31/08* (2013.01); *F16H 2045/021* (2013.01); *F16H 2045/0205* (2013.01)

(58) Field of Classification Search
CPC ............ F16H 45/02; F16H 2045/0205; F16H 2045/021; F16D 31/02; F16D 31/08
See application file for complete search history.

(56) References Cited

U.S. PATENT DOCUMENTS

| 6,155,392 | A | 12/2000 | Kundermann |
|---|---|---|---|
| 7,992,694 | B2 | 8/2011 | Krause et al. |
| 9,410,624 | B2 | 8/2016 | George |
| 9,494,221 | B2 | 11/2016 | Lindemann et al. |
| 2006/0124421 | A1 | 6/2006 | Ackermann |
| 2008/0308374 | A1 | 12/2008 | Heukelbach et al. |
| 2012/0018267 | A1 | 1/2012 | Lindemann |

(Continued)

FOREIGN PATENT DOCUMENTS

JP   2009-019772 A   1/2009

OTHER PUBLICATIONS

International Search Report and Written Opinion dated Jan. 22, 2021 in PCT/KR2020/013437.

*Primary Examiner* — Charles A Fox
*Assistant Examiner* — Lori Wu
(74) *Attorney, Agent, or Firm* — Oblon, McClelland, Maier & Neustadt, L.L.P.

(57) ABSTRACT

Sealed piston apparatus and related systems for use with vehicle torque converters are disclosed. A disclosed vehicle torque converter includes a housing and a clutch including a piston in the housing. The piston has a first side partially defining a first chamber and a second side, opposite the first side, partially defining a second chamber. The vehicle torque converter also includes a first seal operatively coupled to the piston and a second seal operatively coupled to the piston. The vehicle torque converter also includes an orifice positioned on the piston radially inward relative to a clutch pack of the clutch. The orifice is configured to provide a flow of a fluid between the first and second chambers during a lockup on operation of the vehicle torque converter to lubricate the clutch. The first seal is a one-way seal.

19 Claims, 16 Drawing Sheets

(56) References Cited

U.S. PATENT DOCUMENTS

| | | |
|---|---|---|
| 2012/0073931 A1 | 3/2012 | Yun |
| 2019/0044410 A1 | 2/2019 | Vanni et al. |
| 2019/0136914 A1 | 5/2019 | Roses et al. |
| 2019/0136950 A1 | 5/2019 | Welch |
| 2019/0162285 A1 | 5/2019 | Matsuoka |
| 2019/0323588 A1* | 10/2019 | Jo .......................... F16H 45/02 |

* cited by examiner

SEALED PISTON APPARATUS AND RELATED SYSTEMS FOR USE WITH VEHICLE TORQUE CONVERTERS

FIELD OF THE DISCLOSURE

This disclosure relates generally to vehicles and, more particularly, sealed piston apparatus and related methods for use with vehicle torque converters.

BACKGROUND

Some motor vehicles having automatic transmission functionality employ a fluid coupling, such as torque converter, that is interposed between an engine and a transmission to facilitate transferring torque from the engine to the transmission. Such torque converters typically include a controllable lockup clutch that is configured to engage to provide a mechanical connection between the transmission and the engine during certain driving conditions, which increases torque converter efficiency as well as vehicle fuel economy.

SUMMARY

An example vehicle torque converter includes a housing and a clutch including a piston in the housing. The piston has a first side partially defining a first chamber and a second side, opposite the first side, partially defining a second chamber. The vehicle torque converter also includes a first seal operatively coupled to the piston and a second seal operatively coupled to the piston. The vehicle torque converter also includes an orifice positioned on the piston radially inward relative to a clutch pack of the clutch. The orifice is configured to provide a flow of a fluid between the first and second chambers during a lockup on operation of the vehicle torque converter to lubricate the clutch. The first seal is a one-way seal.

Another example vehicle torque converter includes a housing and a clutch including a piston in the housing. The piston has a first side partially defining a first chamber and a second side, opposite the first side, partially defining a second chamber. The vehicle torque converter also includes a first seal operatively coupled to the piston or a hub and a second seal operatively coupled to the piston. The first seal is configured to provide a flow of a fluid between the first and second chambers during a lockup on operation of the vehicle torque converter to lubricate the clutch. The fluid flows across the first or second seal between the first and second chambers during a lockup off operation of the vehicle torque converter to circulate the fluid through the housing and a vehicle transmission system.

Another example vehicle torque converter includes a housing. The vehicle torque converter also includes a clutch having a balance plate and piston that are in the housing and movably coupled together. The balance plate and the piston define a first chamber. The piston and a cover define a second chamber. The balance plate and an impeller define a third chamber. The vehicle torque converter also includes a one-way seal operatively coupled to the piston or the balance plate. The vehicle torque converter also includes an orifice positioned on the balance plate. The orifice is configured to provide a flow of a fluid between the first and third chambers during a lockup on operation of the vehicle torque converter.

The foregoing paragraphs have been provided by way of general introduction, and are not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are not to scale. In general, the same reference numbers will be used throughout the drawing(s) and accompanying written description to refer to the same or like parts.

DETAILED DESCRIPTION

Figure 1:
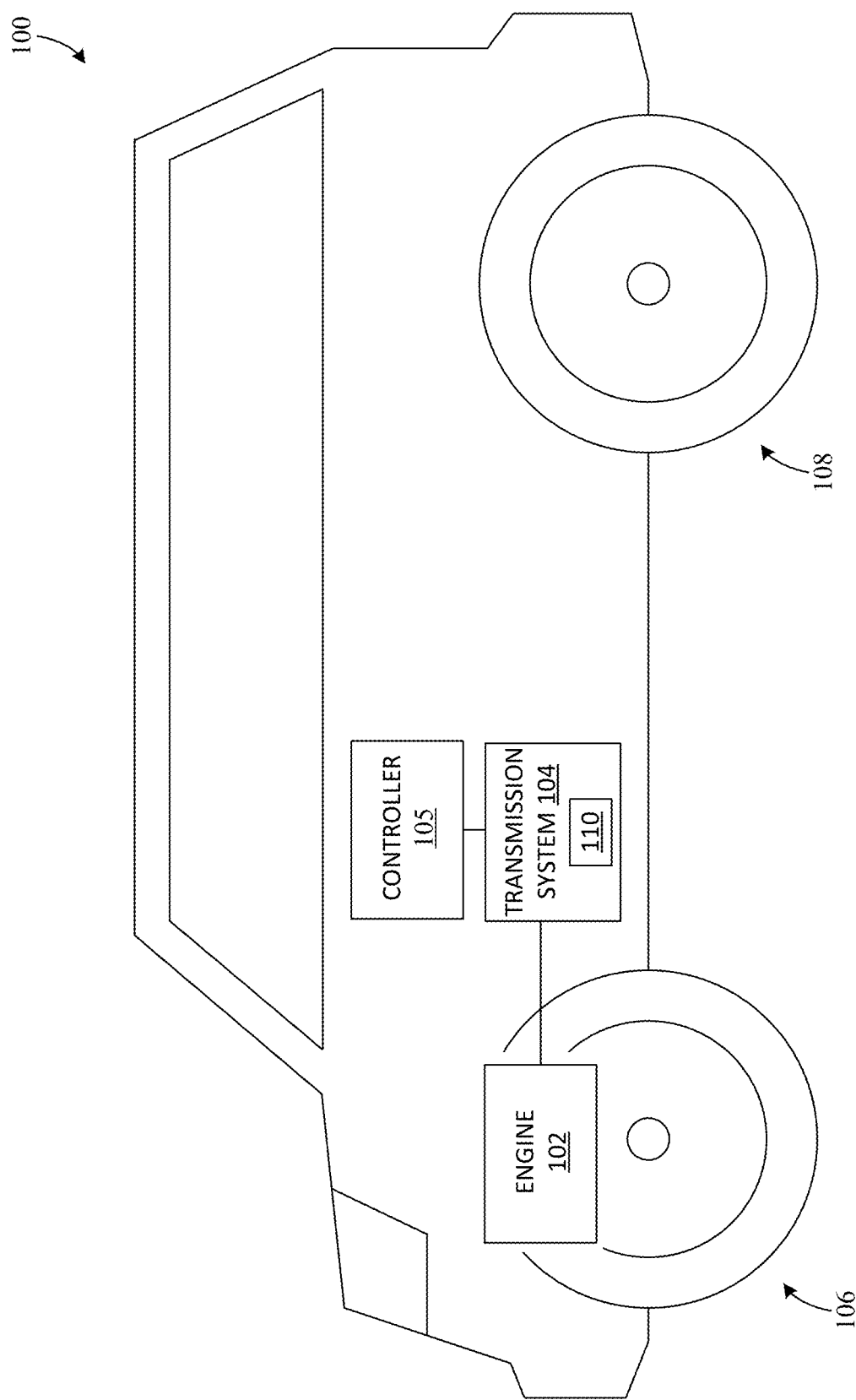
FIG. 1 is a schematic illustration of an example vehicle in which examples disclosed herein can be implemented.

Some known two-pass (sometimes referred to as two-passage) torque converters include a lockup clutch that is configured to slip during clutch engagement. However, such known two-pass torque converters have relatively high clutch response times. That is, these known clutches begin to engage and/or slip when a relatively high differential fluid pressure is applied to a clutch piston. Additionally, slip control variation associated with these known two-pass torque converters is relatively high. That is, controlling slip of a lockup clutch for a known two-pass torque converter is difficult, which results in higher or more slip than necessary. For example, slip speed (e.g., in revolutions per minute (RPM)) associated with the clutch piston suddenly changes (e.g., decreases) with relatively small changes in the differential fluid pressure. As a result, these known two-pass torque converters may not dissipate enough energy to sufficiently achieve certain noise, vibration, and harshness (NVH) requirements.

Alternatively, some known three-pass (sometimes referred to as three-passage) torque converters provide refined slip control. However, such known three-pass torque converters require complex hydraulic control and an additional oil pass in a transmission gearbox to operate the lockup clutch, which incurs substantial costs. That is, these known three-pass torque converters are configured for use with a three-pass vehicle transition system. Further, such known three-pass torque converters do not provide a leakage flow across the clutch piston during clutch engagement, which may increase heat in the torque converter resulting from insufficient lubrication of the clutch.

Sealed piston apparatus and related systems for use with vehicle torque converters are disclosed. Examples disclosed herein provide an example piston (e.g., a sealed, clutch piston) of a clutch (e.g., a lockup clutch) for a vehicle torque converter such. The vehicle torque converter is configured to operatively couple between a vehicle transmission system and a vehicle engine to facilitate transferring torque from the vehicle engine to the transmission system. The disclosed transmission system is configured to convey a fluid (e.g., a hydraulic fluid) through the torque converter to actuate the disclosed piston, thereby engaging and/or disengaging the clutch. Additionally, to facilitate controlling the fluid during and/or after a lockup operation of the torque converter, disclosed examples also provide one or more example seals, each of which is operatively coupled to the disclosed piston and/or a different component of the vehicle torque converter. For example, a first disclosed seal (e.g., a one-way seal) is positioned at an outer radial or distal portion of the piston, and a second disclosed seal (e.g., a one-way seal) is positioned at an inner radial or proximal portion of the piston opposite the distal portion. The disclosed seal(s) extend through respective seal groove(s) formed by one or more components of the torque converter. For example, the first seal extends through a first seal groove that is positioned on the piston, and the second seal extends through a second seal groove positioned on a hub of the torque converter.

In particular, when implemented in a three-pass torque converter, the disclosed seal(s) are sized, shaped, structured, and/or otherwise configured to convert the three-pass torque converter to a two-pass torque converter suitable for use with a two-pass transmission system, which is discussed in greater detail below in connection with FIGS. 3-5. Similarly, when implemented in four-pass torque converter, the disclosed seal(s) are sized, shaped, structured, and/or otherwise configured to convert the four-pass torque converter to a three-pass torque converter suitable for use with a three-pass transmission system, which is discussed in greater detail below in connection with FIG. 8. Thus, disclosed examples reduce a pass of a vehicle torque converter that would have otherwise been required by the above-mentioned known torque converters for clutch operation.

Additionally, the disclosed seal(s) enable the clutch to engage and/or begin slipping when a differential fluid pressure applied to the piston is relatively low compared to the above-mentioned known two-pass torque converters, as discussed further below in connection with FIG. 12. As such, disclosed examples increase clutch response and/or sensitivity. Further, the seal(s) also reduce slip variation for the clutch across a substantially wide range of differential fluid pressures, which improves slip control of the clutch, as discussed further below in connection with FIGS. 13-16. As a result, disclosed examples improve clutch performance while reducing complexity of hydraulic controls of the transmission system, which would have otherwise been unattainable using the above-mention known torque converters. Additionally, disclosed examples reduce costs typically incurred by using a higher pass transmission system to control a state of the clutch.

The disclosed piston has a first side partially defining a first chamber in a housing of the torque converter. Further, the disclosed piston has a second side, opposite the first side, partially defining a second chamber in the housing. In some examples, one or more (e.g. all) of the disclosed seal(s) are one-way seals. For example, when implemented as a one-way seal, the first seal and/or the first seal groove is/are configured such that (a) the fluid does not flow across the first seal or between the first and second chambers during a lockup on operation of the torque converter and (b) the fluid flows across the first seal between the first and second chambers during a lockup off operation (e.g., after the lockup on operation) of the torque converter to circulate the fluid through the housing and the transmission system. To facilitate such one-way sealing functionality, the disclosed seal(s) are movable in response to the transmission system changing a direction in which the fluid flows through the housing. In such examples, a differential fluid pressure applied to the first seal urges the first seal away from a first side of the hub forming the first seal groove and toward a second side of the hub, opposite the first side, forming the first seal groove. In some examples, the disclosed seal groove(s) are sized, shaped, structured, and/or otherwise configured to provide such one-way sealing functionality to the respective seal(s), which is discussed further below in connection with FIGS. 6, 7A, and 7B. Additionally or alternatively, some disclosed examples provide such one-way sealing functionality to the seal(s) via one or more elastic members, which is discussed in greater detail below in connection with FIGS. 9A, 9B, and 10. Additionally or alternatively, some disclosed examples provide such one-way sealing functionality to the seal(s) via one or more protrusions and/or shaping the seal(s), which is discussed in greater detail below in connection with FIGS. 11A and 11B.

Additionally, to facilitate cooling the clutch, some disclosed examples provide one or more example orifices, each of which is positioned on the piston and/or, in some examples, a balance plate in the housing. For example, a first disclosed orifice extends through the piston to fluidly couple the first and second chambers together. During the lockup on operation, the piston experiences a differential fluid pressure when a first fluid pressure associated with the first chamber is different relative to a second fluid pressure associated with the second chamber, which causes the piston to actuate. In such examples, the orifice(s) are positioned below or radially inward relative to a facing diameter at which the piston engages a clutch plate. In particular, the orifice(s) leak the fluid (i.e., provide a controlled flow of the fluid) between the first and second chambers (i.e., the fluid passes through the piston via the orifice(s)) such that the fluid passes across a face of the piston in direct contact with the clutch plate to provide lubrication, thereby improving thermal capacity of the clutch. Further, in such examples, the orifice(s) are configured to flow the fluid therethrough at a relatively high, limited rate, for example, that is between about 0.3 liters per minute (L/min) and about 1.5 L/min. Additionally, in some such examples, the transmission system is configured to provide a reverse flow of the fluid through the torque converter, which facilitates controlling a flow of the fluid across the piston face. That is, a fluid channel associated with an input shaft has a relatively high fluid pressure associated therewith during the lockup on operation, and a fluid channel associated with a stator shaft has a relatively low fluid pressure associated therewith during the lockup on operation.

In addition or alternatively to the orifice(s), the seal(s) and/or the seal groove(s) provide such a leakage flow of the fluid. For example, the first seal and/or the first seal groove is/are configured such that the fluid flows across the first seal in a controlled manner between the first and second chambers during the lockup on operation of the torque converter to lubricate the clutch.

FIG. 1 is a schematic illustration of a vehicle (e.g., a car, a truck, a sport utility vehicle (SUV), etc.) 100 in which examples disclosed herein can be implemented. According to the illustrated example of FIG. 1, the vehicle 100 includes an engine (e.g., an internal combustion engine) 102, a transmission system 104, a controller 105, and one or more wheels 106, 108 (sometimes referred to as road wheels), two of which are shown in this example, (i.e., a first or front wheel 106 and a second or rear wheel 108).

The transmission system 104 of FIG. 1 can be implemented, for example, using one of a two-pass automatic transmission, a three-pass automatic transmission, etc. In particular, the transmission system 104 of FIG. 1 is structured and/or configured to transfer torque from the engine 102 to the wheel(s) 106, 108, for example, to move the vehicle 100. For example, the engine 102 generates a torque (sometimes referred to as an engine torque) and, in response, the transmission system 104 controls an amount or degree of the engine torque that is provided to the wheel(s) 106, 108. In some examples, the transmission system 104 includes a hydraulic system 110 operable by the controller 105, which facilities control of a torque converter clutch (e.g., the first clutch 312 discussed below) while the vehicle 100 is driving. The hydraulic system 110 can be implemented, for example, using a pump and one or more valves (e.g., one or more solenoid valves). In particular, the hydraulic system 110 of FIG. 1 is configured to convey a fluid (e.g., a pressurized hydraulic fluid) through a torque converter housing to change a state of the torque converter clutch, which is discussed in greater detail below.

The controller 105 of FIG. 1 can be implemented, for example, using an electronic control unit (ECU) such as a transmission control module (TCM). The vehicle controller 105 is communicatively coupled to the valve(s) of the hydraulic system 110, for example, via a transmission or signal wire, a bus (e.g., a controller area network (CAN)), radio frequency, etc. In particular, the controller 105 is configured to direct the hydraulic system 110 to change the state of the torque converter clutch based on a detected condition of the vehicle 100. For example, the vehicle controller 105 causes at least one of the valve(s) to open and/or close when the vehicle 100 is traveling at a relatively high speed. Further, to facilitate detecting such a condition of the vehicle, the controller 105 is also communicatively coupled to one or more sensors of the vehicle 100 to receive data from the sensor(s).

Figure 2:
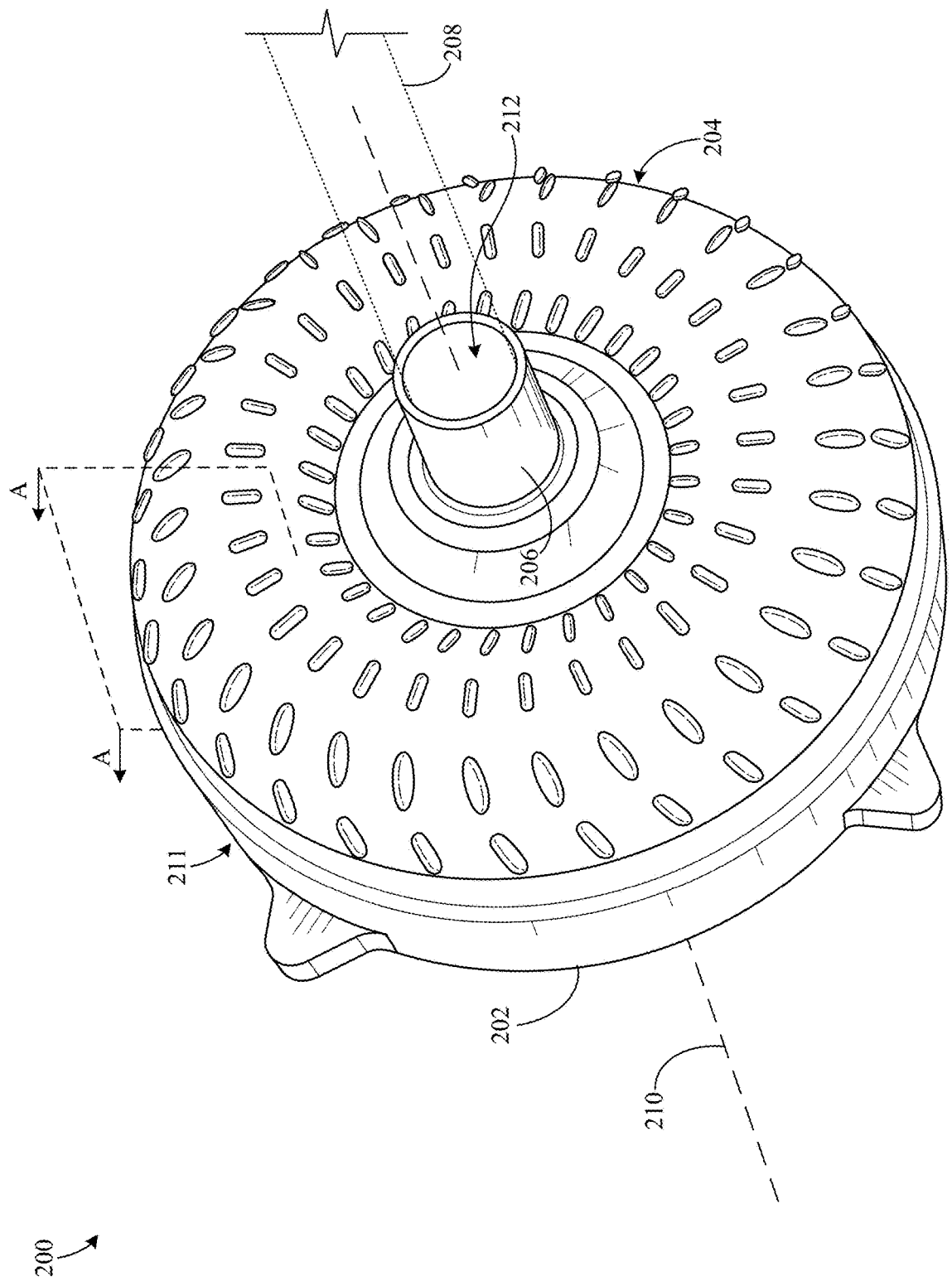
FIG. 2 is a view of an example torque converter in which examples disclosed herein can be implemented.

FIG. 2 is a view of an example torque converter 200 in which examples disclosed herein can be implemented. In some examples, the torque converter 200 of FIG. 2 is implemented in the vehicle 100 to facilitate transferring torque between the engine 102 and the transmission system 104. That is, the vehicle 100 of FIG. 1 includes the torque converter 200. In such examples, the torque converter 200 of FIG. 2 is configured to operatively couple between the engine 102 and the transmission system 104 of the vehicle 100 such that the engine torque is transmittable through the torque converter 200 from the engine 102 to the transmission system 104. According to the illustrated example of FIG. 2, the torque converter 200 includes a cover 202, an impeller 204, and a first hub (e.g. a drive hub) 206

The torque converter 200 of FIG. 2 is changeable between a first operating mode (e.g., an unlocked or hydraulic operating mode) that is associated with a first operating characteristic of the torque converter 200 and a second operating mode (e.g., a lockup or locked operating mode) that is associated with a second operating characteristic of the torque converter 200 different relative to the first operating characteristic. When the torque converter 200 is in the first operating mode thereof, the torque converter 200 allows for substantial rotational or angular deviation between the engine 102 and a first shaft (e.g., a transmission input shaft) 208 of the transmission system 104, for example, such that a rotational speed of the first shaft 208 is different relative to a rotational speed of a crankshaft of the engine 102. As a result, the engine 102 can remain in operation (i.e., the crankshaft remains rotating) when the vehicle 100 is stopped (i.e., the first shaft 208 is not rotating) without causing the engine 102 to stall or adversely affecting the engine 102 in another manner. Further, in such examples, the torque converter 200 increases or multiplies the engine torque provided to the transmission system 104 and/or the wheel(s) 106, 108 when the vehicle 100 drives at certain speeds (e.g., relatively low speeds).

In some examples, the torque converter 200 is configured to substantially prevent rotational or angular deviation of the cover 202 relative to the first shaft 208 when the torque converter 200 is in the second operating mode thereof, for example, via the first clutch 312 discussed below. In such examples, the first clutch 312, when engaged, provides a mechanical connection between the first shaft 208 and the engine 102. As a result, the torque converter 200 reduces or eliminates engine power loss typically associated with fluid drag during certain driving conditions (e.g., when the vehicle 100 is traveling at relatively high speeds). Additionally, the torque converter 200 is configured to dampen one or more torsional vibrations generated by the engine 102 when the torque converter 200 is in the second operating mode or transitioning from the first operating mode to the second operating mode, for example, via slipping the first clutch 312.

The cover 202 of FIG. 2 is relatively non-rotatably (i.e., fixedly) coupled to a component (e.g., the crankshaft or a flywheel) associated with the engine 102 to receive the engine torque or output from the engine 102, for example, via one or more example fasteners and/or one or more example fastening methods or techniques. That is, the component associated with the engine 102 supports one or more (e.g., all) of the cover 202, the impeller 204, and/or, more generally, the torque converter 200 when the cover 202 and the component are assembled. In some examples, the torque converter 200 includes a flywheel that is interposed between the cover 202 and the crankshaft. Additionally, the cover 202 is relatively non-rotatably (i.e., fixedly) coupled to the impeller 204 to drive the impeller 204 via the engine torque, for example, via one or more example fasteners and/or one or more example fastening methods or techniques (e.g., welding). That is, the cover 202 and the impeller 204, together, are rotatable relative to a first axis (e.g., an axis of rotation) 210 associated with the torque converter 200 in the same direction (e.g., clockwise or counterclockwise). Further, as shown in FIG. 2, the cover 202 and the impeller 204 form and/or define a housing 211 of the torque converter 200 in which one or more torque converter components are disposed.

The impeller 204 of FIG. 2 is structured and/or configured to control a parameter (e.g., a flow rate, a fluid pressure, etc.) of a fluid in the torque converter housing 211 when the impeller 204 rotates relative to the first axis 210, for example, via one or more fins, one or more blades, one or more vanes, and/or any other suitable fluid flow control member positioned on the impeller 204. Additionally, the impeller 204 is relatively non-rotatably (i.e., fixedly) coupled to the cover 202 to receive the engine torque therefrom, as previously mentioned. In some examples, in response to the impeller 204 rotating relative to the first axis 210 when the torque converter 200 is in the first operating mode thereof, the torque converter 200 generates an output or a torque (sometimes referred to as an output torque) for the transmission system 104, a magnitude of which is based on, for example, any of the engine torque, a speed of the vehicle, torus parameters, parameters of the fluid flow control members, fluid parameters, fluid properties, etc.

The first hub 206 of FIG. 2 is connected to the pump of the hydraulic system 110. In particular, rotation of the first hub 206 relative to the first axis 210 causes the pump to change a parameter (e.g., a flow rate, a fluid pressure, etc.) of the fluid, for example, in one of (a) a component (e.g., a gearbox) of the transmission system 104, (b) a fluid path or channel associated with the shaft 208, (c) the housing 211, or (d) a combination thereof. Additionally, the first hub 206 of FIG. 2 is configured to removably receive the first shaft 208 associated with the vehicle transmission system 104 via an aperture 212 formed by the first hub 206. As shown in FIG. 2, the first shaft 208 extends at least partially into the housing 211 through the aperture 212.

The first shaft 208 of FIG. 2 is operatively interposed between the torque converter 200 and the component of the transmission system 104 to transfer the output torque from the torque converter 200 to the transmission system 104, thereby driving the wheel(s) 106, 108. In some examples, the first shaft 208 is inserted into the first hub 206, thereby connecting the first shaft 208 to an output portion of the torque converter 200 such as, for example, the second hub 310 discussed below. In such examples, the first shaft 208 and the output portion are relatively non-rotatably (i.e., fixedly) coupled together, for example, via a splined connection.

Figure 3:
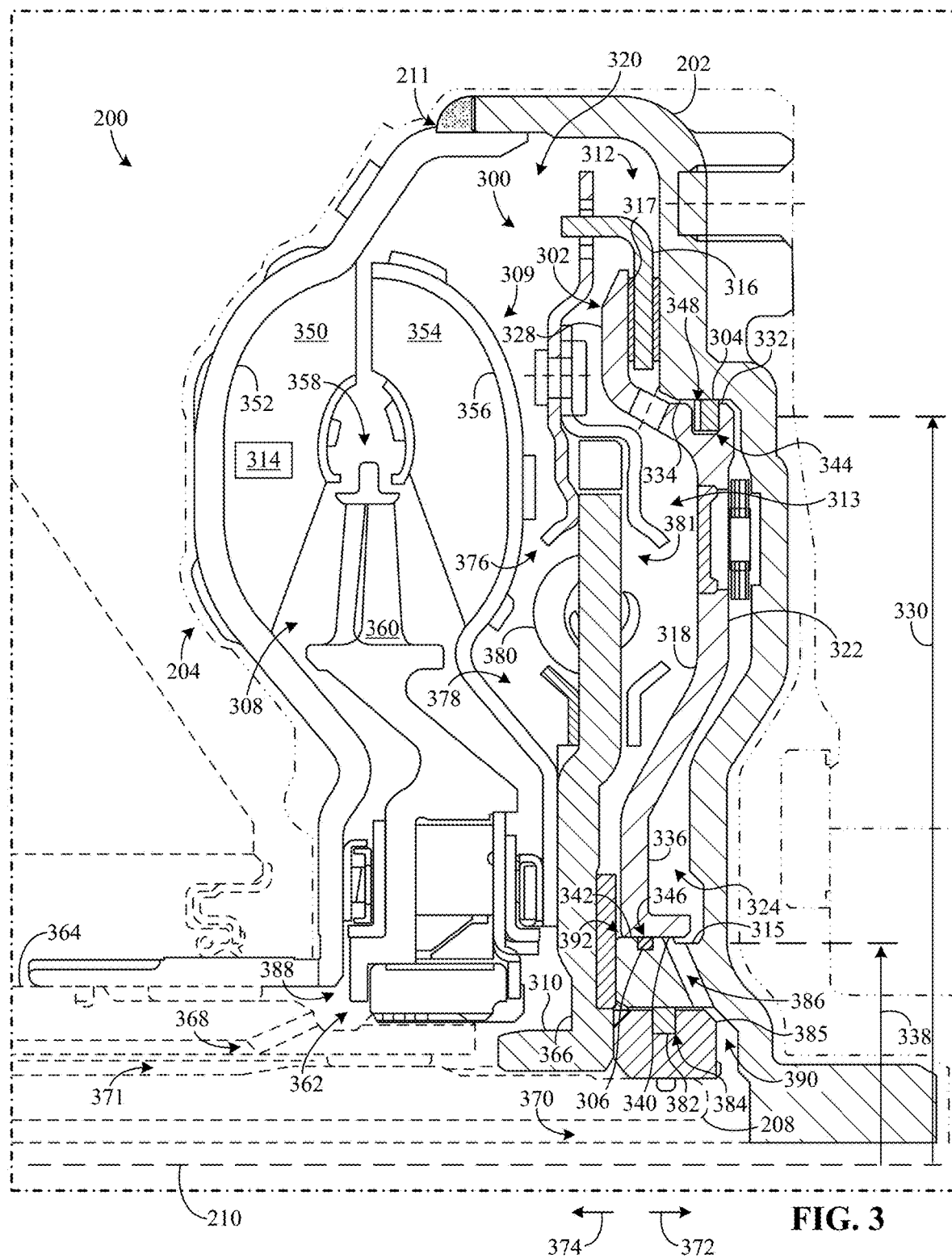
FIG. 3 is a partial cross-sectional view of the example torque converter of FIG. 2 along line A-A and shows an example assembly therein in accordance with the teachings of this disclosure.

FIG. 3 is a partial cross-sectional view of the torque converter 200 of FIG. 2 along line A-A and shows an assembly (e.g., a fluid flow control assembly) 300 therein in accordance with the teachings of this disclosure. According to the illustrated example of FIG. 3, the assembly 300 includes a piston (e.g., a clutch piston) 302, a first seal (e.g., a one-way seal) 304 and a second seal (e.g., a one-way seal) 306, each of which is disposed in a cavity 308 formed by the housing 211. Further, in addition to the assembly 300, the torque converter 200 of FIG. 3 also includes a turbine 309, a second hub (e.g., a turbine hub) 310, a first clutch (e.g., a lockup clutch) 312, and a first damper (e.g., a spring damper) 313. The cavity 308, and/or, more generally, the housing 211 is/are configured to receive a fluid (e.g., a hydraulic fluid such as any of torque fluid, transmission fluid, etc.) 314 for operating the first clutch 312 and/or, more generally, the torque converter 200.

The piston 302 of FIG. 3 can be implemented, for example, using an annular body such as a plate. The piston 302 of FIG. 3 is sized and/or shaped to fit between the cover 202 and the first damper 313 and/or the turbine 309. According to the illustrated example of FIG. 3, the piston 302 is supported by a third hub (e.g., a collar hub) 315 of the torque converter 200 positioned on the cover 202 such that the piston 302 is rotatable relative to the third hub 315. For example, the piston 302 is spaced by a relatively small distance and/or engages (e.g., slidably engages) the third hub 315. In particular, to change a state of the first clutch 312, the fluid 314 urges the piston 302 toward and/or into engagement with a first plate (e.g., a clutch plate) 316 to transfer a torque (e.g., the engine torque) from the cover 202 to the first plate 316. That is, in such examples, the piston 302 and the cover 202 squeeze the first plate 316 to generate friction for the first clutch 312. For example, the piston 302 of FIG. 3 has a face (e.g., an outer, annular surface) 317 that is configured to engage (e.g., slidably engage) the first plate 316. The face 317 is sometimes referred to as a clutch face.

In some examples, the cover 202 forms and/or defines the third hub 315. In such examples, the cover 202 and the third hub 315 share a cross-sectional area, as shown in FIG. 3. However, in some examples, the cover 202 and the third hub 315 are separate components that are configured to non-relatively rotatably (i.e., fixedly) couple together, for example, via one or more fasteners and/or one or more fastening methods or techniques.

The piston 302 of FIG. 3 has a first side 318 partially forming a first chamber (e.g., a fluid chamber) 320, for example, together with the impeller 204. Additionally, in some examples, at least a portion (e.g., an outer radial or distal portion) of the cover 202 of FIG. 3 partially forms and/or defines the first chamber 320 together with the first side of the piston 302 and the impeller 204. Further, the piston 302 of FIG. 3 also has a second side 322, opposite the first side 318, partially forming a second chamber (e.g., a fluid chamber) 324 together with the cover 202. As such, the first and second chambers 320, 324 are positioned on opposite sides 318, 322 of the piston 302. In particular, to facilitate controlling fluid pressure associated with the chambers 320, 324 of the housing 211, the first seal 304 and the second seal 306 are operatively coupled to the piston 302.

The first seal 304 of FIG. 3 can be implemented, for example, using a square-ring, an O-ring, etc. In such examples, the first seal 304 has a cross-sectional area having a shape (e.g., one of a square, a rectangle, a circle, etc. or any other polygon) that is substantially uniform along a length of the first seal 304. The first seal 304 is constructed of one or more materials having suitable properties and/or characteristics (e.g., any of strength, rigidity, durability, etc.) such as, for example, a high temperature resistance polymer material or thermoplastic (sometimes referred to as performance plastic or engineered plastic). Similarly, the second seal 306 of FIG. 3 can be implemented, for example, using a square-ring, an O-ring, etc. In such examples, the second seal 306 has a cross-sectional area having a shape (e.g., one of a square, a rectangle, a circle, etc. or any other polygon) that is substantially uniform along a length of the second seal 304. The second seal 306 is constructed of one or more materials having suitable properties and/or characteristics (e.g., any of strength, rigidity, durability, etc.) such as, for example, a high temperature resistance polymer material or thermoplastic.

The first seal 304 of FIG. 3 is positioned at or adjacent a distal portion (e.g., an outer radial portion) 328 of the piston 302. As such, the first seal 304 is positioned at a first radius 330 relative to the first axis 210. In particular, the first seal 304 is configured to sealingly engage an outer surface 332 of the piston 302 and an inner surface 334 of the cover 202, thereby forming a first fluid seal (e.g., a temporary or adjustable fluid seal). On the other hand, the second seal 306 of FIG. 3 is positioned at or adjacent a proximal end or portion (e.g., an inner radial portion) 336 of the piston 302 opposite the distal portion 328. As such, the second seal 306 is positioned at a second radius 338 relative to the first axis 210 less than the first radius 330. In particular, the second seal 306 is configured to sealingly engage an inner surface 340 of the piston 302 and an outer surface 342 of the third hub 315, thereby forming a second fluid seal (e.g., a temporary or adjustable fluid seal).

To facilitate carrying the first seal 304 and the second seal 306, the assembly 300 of FIG. 3 also includes a first seal groove 344 and a second seal groove 346 for the respective first and second seals 304, 306. In some examples, the first and second seal grooves 344, 346 are positioned on different components of the torque converter 200, as shown in FIG. 3. For example, the first seal groove 344 of FIG. 3 is formed and/or defined by an area of the outer surface 332 of the piston 302. However, in some examples, the first seal groove 344 is formed and/or defined by a different torque converter component such as, for example, the fifth plate 502 discussed below. In any case, the first seal 304 of FIG. 3 is positioned in the first seal groove 344 and extends through the first seal groove 344. In particular, the first seal 304 of FIG. 3 is interposed between the piston 302 and the cover 202. Further, the second seal groove 346 of FIG. 3 is formed and/or defined by an area of the outer surface 342 of the third hub 315. However, in some examples, the second seal groove 346 is formed and/or defined by a different torque converter component. In any case, the second seal 306 of FIG. 3 is positioned in the second seal groove 346 and extends through the second seal groove 346. In particular, the second seal 306 of FIG. 3 is interposed between the piston 302 and the third hub 315.

In some examples, both the first and second seals 304, 306 are configured to substantially maintain a first differential fluid pressure that is experienced by the piston 302 during a lockup on operation of the torque converter 200 (e.g., when the first clutch 312 is at least partially engaged) where a first fluid pressure associated with the first chamber 320 is greater than a second fluid pressure associated with the second chamber 324. In such examples, both the first and second seals 304, 306 are sized, shaped, structured, and/or otherwise configured to prevent a first flow (e.g., a forward flow) of the fluid 314 from first chamber 320 to the second chamber 324.

Conversely, the first seal 304 and/or the second seal 306 is/are configured to adjust (e.g., reduce) a second differential fluid pressure experienced by the piston 302 during a lockup off operation of the torque converter 200 (e.g., when the first clutch 312 is disengaged) (e.g., after the lockup on operation) where the second fluid pressure associated with the second chamber 324 is greater than the first fluid pressure associated with the first chamber 320. For example, the first seal 304 of FIG. 3 is movable in the respective first seal groove 344 and includes one or more recessed areas 348 positioned thereon and/or radially distributed relative to the first axis 210, which allows the fluid 314 to flow across the first seal 304. In such examples, each of the first seal 304 and/or the second seal 306 is a one-way seal whereby the fluid 314 is flowable thereacross only from the second chamber 324 to the first chamber 320. In this manner, the seal(s) 304, 306 allow the fluid 314 to circulate through the housing 211 and the transmission system 104 during the lockup off operation. Accordingly, the first seal 304 and/or the second seal 306 is/are sized, shaped, structured, and/or otherwise configured to allow a second flow (e.g., a reverse flow) of the fluid 314, opposite the first flow, from the second chamber 324 to the first chamber 320. Additionally or alternatively, in some examples, the first seal groove 344 and/or the second seal groove 346 is/are sized, shaped, structured, and/or otherwise configured to allow the second flow of the fluid 314 during the lockup off operation.

The turbine 309 of FIG. 3 is configured to receive the fluid 314 from the impeller 204 during engine operation (e.g., when the first clutch 312 is disengaged), thereby generating the output torque for the second hub 310. For example, the impeller 204 includes one or more fluid flow control members (e.g., fins, blades, vanes) 350 and a housing or first shell (e.g., an impeller shell) 352 on which the fluid flow control member(s) 350 are positioned. The fluid flow control members 350 of the impeller 204 are radially distributed relative to the first axis 210 and extend radially outward relative to the first axis 210. Similarly, the turbine 309 of FIG. 3 includes one or more fluid flow control members (e.g., fins, blades, vanes, etc.) 354 and a housing or second shell (e.g., a turbine shell) 356 on which the fluid flow control member(s) 354 are positioned. The fluid flow control members 354 of the turbine 309 are radially distributed relative to the first axis 210 and extend radially outward relative to the first axis 210. As the fluid flow control members 350 of the impeller 204 rotate together with the cover 202 relative to the first axis 210, the fluid 314 is urged and/or pumped radially outward relative to the first axis 210 toward the fluid flow control members 354 of the turbine 309. That is, the fluid flow control members 350 of the impeller 204 direct a flow of the fluid 314 onto the fluid flow control members 354 of the turbine 309 such that the fluid 314 imparts fluid force(s) on the fluid flow control members 354 of the turbine 309. The turbine 309 of FIG. 3 generates the torque or output of the torque converter 200 as a result of such fluid interaction, a degree of which is based on one or more parameters associated with the torque converter 200 such as, for example, one or more of a rotational speed of the impeller 204, a rotational speed of the turbine 309, angles of the respective fluid flow control members 350, 354, lengths of the respective fluid flow control members 350, 354, properties (e.g., viscosity) of the fluid 314, etc.

In some examples, to increase the torque generated by the turbine 309 and/or improve torque converter efficiency, the torque converter 200 also includes a stator 358 operatively interposed between the impeller 204 and the turbine 309. The stator 358 of FIG. 3 is relatively rotatably coupled to the housing 211, for example, via a second bearing (e.g., a thrust bearing) operatively interposed between the stator 358 and a portion (e.g., the impeller 204) of the housing 211. In particular, the stator 358 of FIG. 3 includes one or more fluid flow control members (e.g., fins, blades, vanes, etc.) 360 positioned thereon. The fluid flow control members 360 of the stator 358 are radially distributed relative to the first axis 210 and extend radially outward relative to the first axis 210. More particularly, the fluid flow control members 360 of the stator 358 are configured to change a flow direction of the fluid 314 when the fluid 314 is traveling from the turbine 309 to the impeller 204, which increases efficiency of the impeller 204 in pumping the fluid 314 and/or, more generally, increases efficiency of the torque converter 200 by advantageously utilizing an inertia of the fluid 314.

For example, as the turbine 309 rotates, the fluid flow control members 354 of the turbine 309 direct the fluid 314 onto the fluid flow control members 360 of the stator 358 in a first direction and, in response, the fluid flow control members 360 of the stator 358 direct the fluid 314 onto the fluid flow control members 350 of the impeller 204 in a second direction different from the first direction. Additionally, to account for stator rotation resulting from such fluid control, the torque converter 200 also includes a second clutch (e.g., a one-way clutch) 362 operatively coupled between the stator 358 and a second shaft (e.g., a fixed shaft) 364 of the transmission system 104. The second shaft 364 is sometimes referred to as a stator shaft. In particular, the second clutch 362 is configured to prevent the stator 358 from rotating relative to the first axis 210 and/or the second shaft 364 in a single direction (e.g., clockwise or counterclockwise).

The second hub 310 of FIG. 3 is relatively rotatably coupled to the stator 358 and, consequently, the housing 211, for example, via a third bearing (e.g., a thrust bearing) operatively interposed between the second clutch 362 and one of (a) a portion of the second hub 310 or (b) a portion of the turbine 309. Also, the second hub 310 is non-relatively rotatably (i.e., fixedly) coupled to the second shell 356 of the turbine 309. As such, the turbine 309 and the second hub 310, together, are rotatable relative to the housing 211. According to the illustrated example of FIG. 3, the second hub 310 is sized, shaped, structured, and/or otherwise configured to receive the first shaft 208 and provide a torque (e.g., generated by the turbine 309 or the first clutch 312) to the first shaft 208. In some examples, the second hub 310 defines an inner surface (e.g., an inner circumferential surface) having grooves that are positioned thereon, and the first shaft 208 defines an outer surface (e.g., an outer circumferential surface) having splines that are positioned thereon. In such examples, the grooves of the second hub 310 receive the splines of the first shaft 208, thereby non-relatively rotatably (i.e., fixedly) coupling the second hub 310 to the first shaft 208. In other words, the second hub 310 and the first shaft 208 of FIG. 2 are splined together such that the first shaft 208 and the second hub 310 rotate together relative to the first axis 210 in the same direction. Similarly, the second shaft 364 and a portion of the second clutch 362 are splined together.

In some examples, to facilitate supporting the turbine 309 and/or the first damper 313, the second hub 310 of FIG. 3 defines a first flange 366 extending away from the second hub 310 radially outward relative to the first axis 210. In such examples, the second shell 356 is positioned on the first flange 366 and relatively non-rotatably (i.e., fixedly) coupled the first flange 366, for example, via one or more fasteners and/or one or more fastening methods or techniques (e.g., welding).

According to the illustrated example of FIG. 3, the first clutch 312 is operatively coupled to the torque converter 200. To facilitate clutch operation, the first clutch 312 of FIG. 3 includes the piston 302 and the first plate 316, which are positioned adjacent each other. In some examples, the piston 302 and the first plate 316 form and/or define a clutch pack of the first clutch 312. As used herein, the term "clutch pack" refers to at least two rotatable members of a clutch that are configured to engage each other to generate friction. In particular, the first clutch 312 of FIG. 3 is changeable between a first state (e.g., a disengaged state) thereof and a second state (e.g., a fully engaged state or a partially engaged state) thereof, for example, based on a flow of the fluid 314 through the housing 211 provided by the hydraulic system 110 that generates a differential pressure differential for the piston 302. The first state of the first clutch 312 corresponds to the first operating mode of the torque converter 200. That is, the first clutch 312 provides the first operating mode of the torque converter 200 when the first clutch 312 is in the first state thereof. Further, the second state of the first clutch 312 corresponds to the second operating mode of the torque converter 200. That is, the first clutch 312 provides the second operating mode of the torque converter 200 when the first clutch 312 is in the second state thereof.

In some examples, to facilitate flowing the fluid 314 through the housing 211, the assembly 300 of FIG. 3 also includes one or more fluid passes or channels 368, 370, 371, three of which are shown in this example (i.e., a first fluid channel 368, a second fluid channel 370, and a third fluid channel 371). In such examples, the transmission system 104 is a three-pass transmission system. Each of the fluid channel(s) 368, 370, 371 of the assembly 300 is configured to receive the fluid 314 and convey the fluid 314 between the hydraulic system 110 and the housing 211. That is, the fluid 314 is flowable through the fluid channel(s) 368, 370, 371. In particular, the first fluid channel 368 of FIG. 3 extends through the second shaft 364 to fluidly couple the hydraulic system 110 to the first chamber 320. Further, the second fluid channel 370 of FIG. 3 extends through the first shaft 208 to fluidly couple the hydraulic system 110 to the second chamber 324. Further still, the third fluid channel 371 extends between the first and second shafts 208, 364.

Although FIG. 3 depicts the three fluid channels 368, 370, 371, in some examples, the transmission system 104 is implemented differently, for example, as a two-pass transmission system. In such examples, the assembly 300 does not include the third fluid channel 371 (i.e., the assembly 300 includes only two fluid channels 368, 370).

To provide the second state of the first clutch 312, the controller 105 directs the hydraulic system 110 to control the fluid 314 in the housing 211 such that the first fluid pressure associated with the first chamber 320 is greater than the second fluid pressure associated with the second chamber 324, which provides the first flow of the fluid 314. In particular, as a result of such control of the hydraulic system 110, the fluid 314 is conveyed (a) at a relatively high fluid pressure through the first channel 368 from the hydraulic system 110 to the first chamber 320 and (b) at a relatively low fluid pressure through the second channel 370 from the second chamber 324 to the hydraulic system 110. Accordingly, the resulting first differential fluid pressure experienced by the piston 302 of FIG. 3 urges the piston 302 in a first direction (e.g., a horizontal direction) 372 toward the first plate 316 such that the piston 302, the first plate 316, and/or the cover 202 generate the friction for first clutch 312. In this manner, disclosed examples actuate the piston 302 of FIG. 3 to cause the first clutch 312 to transfer the engine torque from the cover 202 to the first damper 313 and, subsequently, to the second hub 310.

Conversely, to provide the first state of the first clutch 312 during the lockup off operation, the controller 105 directs the hydraulic system 110 to the control the fluid 314 in the housing 211 such that the second fluid pressure associated with the second chamber 324 is greater than the first fluid pressure associated with the first chamber 320, which provides the second flow of the fluid 314. In particular, as a result of such control of the hydraulic system 110, the fluid 314 is conveyed at (a) at a relatively high fluid pressure through the second channel 370 from the hydraulic system 110 to the second chamber 324 and (b) at a relatively low fluid pressure through the first channel 368 from the first chamber 320 to the hydraulic system 110. Accordingly, the resulting second differential fluid pressure experienced by the piston 302 of FIG. 3 urges the piston 302 in a second direction (e.g., a horizontal direction) 374, opposite the first direction 372, away from the first plate 316, which causes the piston 302 to disengage and/or separate from the first plate 316. In this manner, the first clutch 312 of FIG. 3 ceases the torque transfer between the cover 202 and the first damper 313 and, consequently, between the cover 202 and the second hub 310.

In some examples, when in the second state and/or transitioning from the first state to the second state, the first clutch 312 is configured to slip (e.g., at a gradual decreasing angular rate). For example, the piston 302, the first plate 316, and the cover 202 slide against each other as the first differential fluid pressure experienced by the piston 302 increases. In such examples, the controller 105 is configured to direct the hydraulic system 110 to adjust such slipping of the first clutch 312, for example, by increasing (e.g., incrementally) the first differential fluid pressure (e.g., see FIGS. 12 and 13). Further, when the first differential fluid pressure is at or above a locking threshold (e.g., a value corresponding to a particular differential fluid pressure), the first clutch 312 ceases slipping and/or otherwise locks up. For example, the piston 302, the first plate 316, and the cover 202 non-relatively rotatably couple together (e.g., temporarily) while first differential fluid pressure remains at or above the threshold.

The first damper 313 of FIG. 3 facilitates regulating torque output by the torque converter when the first clutch 312 is in the second state thereof. According to the illustrated example of FIG. 3, the first damper 313 includes an input or first damper portion 376, an output or second damper portion 378, and one or more springs (e.g., coil springs) 380. The spring(s) 380 of FIG. 3 are operatively interposed between the first and second damper portions 376, 378 such that a torque (e.g., the engine torque) is transmittable through the spring(s) 380 from the first damper portion 376 to the second damper portion 378. Each of the spring(s) 380 is positioned in a respective spring cavity 381 that is formed by the first damper portion 376 and/or the second damper portion 378. The first and second damper portions 376, 378 of FIG. 3 are rotatable relative to each other. In particular, rotation of the first damper portion 376 relative to the first damper portion 378 compress, decompresses, and/or otherwise changes a state of the spring(s) 380, thereby providing a damping effect (e.g., a damping torque) for the torque converter 200. As a result, the first damper 313 dampens the torsional vibration(s) experienced by the torque converter 200 when the first clutch 312 is in the second state thereof.

The first damper portion 376 of FIG. 3 can be implemented, for example, using one or more plates (e.g., assembled together). In particular, the first damper portion 376 of FIG. 3 is not-relatively rotatably (i.e., fixedly) coupled to the first plate 316 to receive torque therefrom, for example, via one or more fasteners and/or one or more fastening methods or techniques. Further, the second damper portion 378 of FIG. 3 can be implemented, for example, using one or more plates (e.g., assembled together). In some examples, the second damper portion 378 corresponds to and/or is implemented using a component of the torque converter 200 such as, for example, the first flange 366, as shown in FIG. 3. In particular, the second damper portion 378 is configured to provide torque generated by the spring (s) 380 to the first shaft 208.

The first plate 316 of FIG. 3 is non-relatively rotatably (i.e., fixedly) the first damper portion 376, for example, via one or more fasteners and/or fastening methods or techniques. As shown in FIG. 3, the first plate 316 extends between the piston 302 and the cover 202 and curves away therefrom to receive the first damper portion 376.

Additionally, in some examples, to further facilitate controlling the fluid pressures associated with the chambers 320, 324 of the housing 211, the assembly 300 of FIG. 3 also includes a third seal (e.g., a one-way seal) 382 operatively coupled to the second hub 310 and/or the third hub 315. The third seal 382 of FIG. 3 can be implemented, for example, using a square-ring, an O-ring, etc. In such examples, the third seal 382 has a cross-sectional area having a shape (e.g., one of a square, a rectangle, a circle, etc. or any other polygon) that is substantially uniform along a length of the third seal 382. Further, similar to the first or second seal 304, 306, the third seal 382 is constructed of one or more materials having suitable properties and/or characteristics (e.g., any of strength, rigidity, durability, etc.) such as, for example, a high temperature resistance polymer material or thermoplastic. In particular, the third seal 382 of FIG. 3 is configured to sealingly engage an outer surface of the second hub 310 and an inner surface of the third hub 315, thereby forming a third fluid seal (e.g., a temporary or adjustable seal).

In such examples, to facilitate carrying the third seal 382, the assembly 300 of FIG. 3 also includes a third seal groove 384 that is positioned on a component of the torque converter 200. For example, as shown in FIG. 3, the third seal groove 384 is formed and/or defined by an area of the outer surface of the second hub 310 or a body (e.g., an annular body) 385 adjacent and coupled to the second hub 310. In particular, the third seal 382 of FIG. 3 is positioned in the third seal groove 384 and extends through the third seal groove 384.

The third seal 382 of FIG. 3 is configured to substantially maintain the first differential fluid pressure that is experienced by the piston 302 during the lockup on operation where the first fluid pressure associated with the first chamber 320 is greater than the second fluid pressure associated with the second chamber 324. Thus, in such examples, similar to the first and second seals 304, 306, the third seal 382 is configured to prevent the first flow of the fluid 314 from first chamber 320 to the second chamber 324.

Conversely, in some examples, the third seal 382 is configured to adjust (e.g., reduce) the second differential fluid pressure experienced by the piston 302 during the lockup off operation where the second fluid pressure associated with the second chamber 324 is greater than the first fluid pressure associated with the first chamber 320. In particular, in such examples, the third seal 382 is a one-way seal whereby the fluid 314 is conveyable thereacross only from the second chamber 324 to the first chamber 320, which allows the circulation of the fluid 314 through the housing 211 and the transmission system 104. Accordingly, in such examples, the third seal 382 and/or the third seal groove 384 is/are sized, shaped, structured, and/or otherwise configured to allow the second flow of the fluid 314 from the second chamber 324 to the first chamber 320.

In examples where the torque converter 200 is a three-pass torque converter, one of the first seal 304, the second seal 306, the third seal 382, or a combination thereof converts the torque converter 200 to a two-pass torque converter, as shown in FIG. 3. Accordingly, the torque converter 200 of FIG. 3 is configured for use with a two-pass transmission system. In such examples, the hydraulic system 110 is structured and/or configured to change the state of the first clutch 312 via conveying the fluid 314 through the first fluid channel 368 and the second fluid channel 370 (i.e., only two fluid channels 368, 370).

On the other hand, in examples where the torque converter 200 is a four-pass torque converter, one of the first seal 304, the second seal 306, the third seal 382, a different seal, or a combination thereof converts the torque converter 200 to a three-pass torque converter, which is discussed further below in connection with FIG. 8. In such examples, the hydraulic system 110 is structured and/or configured to change the state of the first clutch 312 via conveying the fluid 314 through the first fluid channel 368, the second fluid channel 370, and the third fluid channel 371.

In some examples, the assembly 300 also includes a fourth fluid pass or channel 386 through which the fluid 314 is flowable. In particular, the fourth fluid channel 386 of FIG. 3 extends through the third hub 315 radially outward or inward relative to the first axis 210 to fluidly couple the second chamber 324 to the second fluid channel 370 associated with the first shaft 208. That is, when the torque converter 200 and the transmission system 104 are assembled, the fourth channel 386 is configured to convey the fluid 314 between the second fluid channel 370 and the second chamber 324. In some examples, the second fluid channel 370 and the fourth fluid channel 386 form and/or define a single fluid channel. The fluid channels 368, 370, 371, 386 are sometimes referred to as passes or oil passes. Further, as shown in FIG. 3, the third hub 315 of FIG. 3 extends towards the first flange 366 along the first axis 210 in the second direction 374, which allows for changes in a size and/or shape of the fourth fluid channel 386. For example, the fourth channel 386 may be alternatively sized and/or shaped to fluidly couple the first chamber 320 to the second fluid channel 370, which is discussed further below in connection with FIGS. 5, 6, 7A, and 7B.

In some examples, to allow the fluid 314 to enter and/or exit the housing 211, the assembly 300 also includes one or more openings 388, 390 positioned on the housing 211, two of which are shown in this example (i.e., a first opening 388 and a second opening 390). Each of the first and second openings 388, 390 of FIG. 3 corresponds to an inlet and/or an outlet of housing 211, depending on the flow direction of the fluid 314 provided by the hydraulic system 110. In particular, the fluid 314 is flowable through the first and second openings 388, 390, which enables the hydraulic system 110 to control the state of the first clutch 312. The first opening 388 of FIG. 3 is formed and/or defined by a portion of the impeller 204 and a portion of the stator 358. Accordingly, the fluid 314 can enter and/or exit the first chamber 320 via the first opening 388. Further, the second opening 390 of FIG. 3 is formed and/or defined by a portion of the cover 202 and a portion of or adjacent to the second hub 310. Accordingly, the fluid 314 can enter and/or exit the second chamber 324 via the second opening 390. Additionally, in some examples, the second opening 390 is also formed and/or defined by the fourth fluid channel 386, as shown in FIG. 3.

According to the illustrated example of FIG. 3, the piston 302 includes a third opening (e.g., a bore) 392 centrally disposed thereon. For example, the inner surface 340 of the piston 302 forms and/or defines the third opening 392. In particular, third opening 392 of FIG. 3 is configured to receive the third hub 315. For example, as shown in FIG. 3, the third hub 315 extends through the third opening 392. The third opening 392 of FIG. 3 is sized and/or shaped such that an inner diameter of the piston 302 is slightly larger than an outer diameter of the third hub 315, which facilitates movement of the piston 302 as well as controlling a flow of the fluid via the second seal 306 and/or the second seal groove 346.

Figure 4:
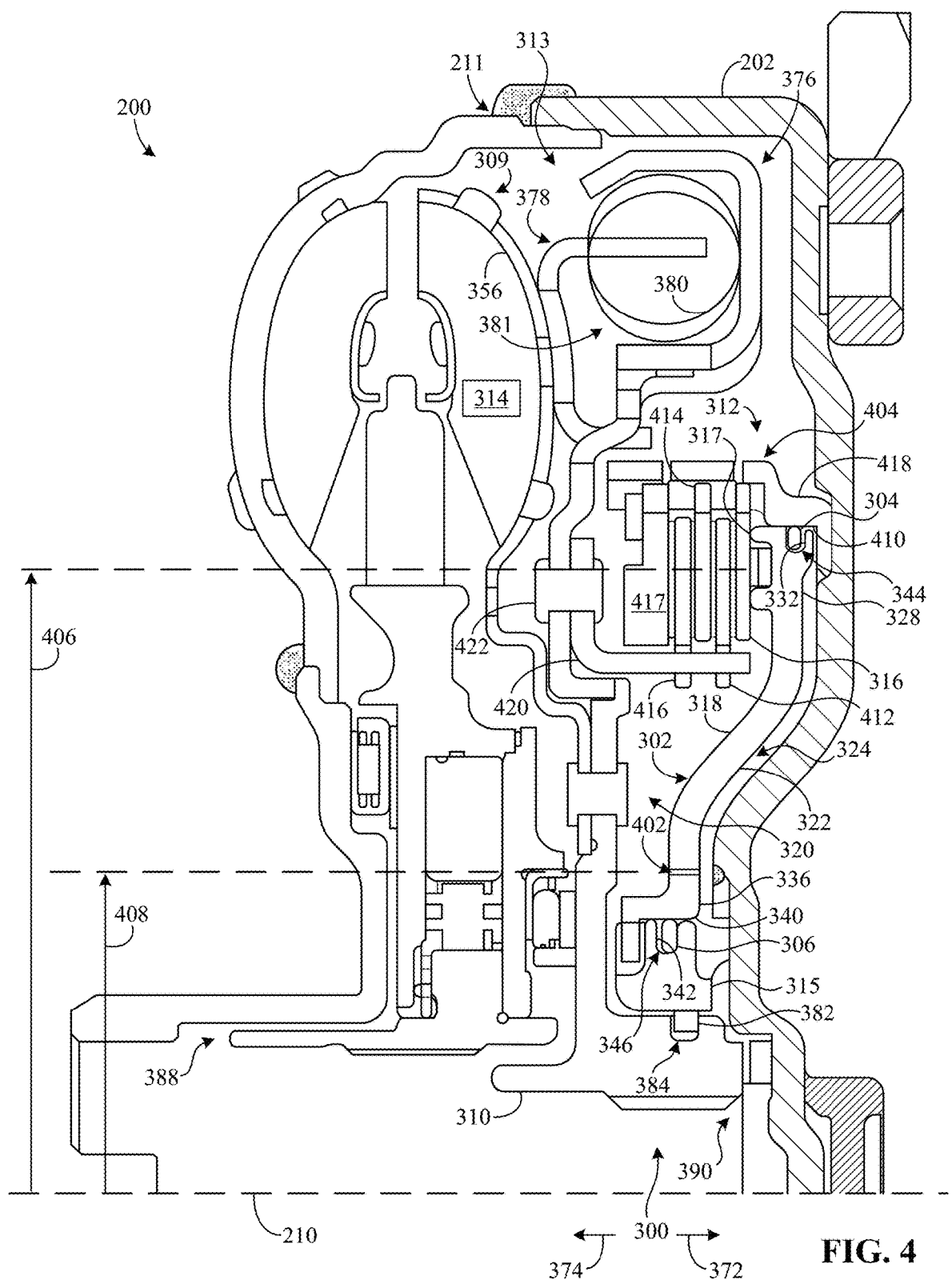
FIG. 4 is another partial cross-sectional view of the example torque converter of FIG. 2 along line A-A and shows an example assembly therein in accordance with the teachings of this disclosure.

FIG. 4 is another partial cross-sectional view of the torque converter 200 of FIG. 2 along line A-A and shows the assembly 300 therein. According to the illustrated example of FIG. 4, the assembly 300 includes the piston 302, the first seal 304, the second seal 306, the third seal 382, and a first orifice 402. The first orifice 402 of FIG. 4 is positioned on and/or formed by the piston 302. In particular, the first orifice 402 extends through the piston 302 to fluidly couple the first chamber 320 to the second chamber 324, which facilitates cooling the first clutch 312 during the lockup on operation when the first clutch 312 is in the second state thereof or transitioning from the first state thereof to the second state thereof. As shown in FIG. 4, the first plate 316 is positioned adjacent and/or faces the first side 318 of the piston 302.

According to the illustrated example of FIG. 4, to provide the second state of the first clutch 312 during the lockup on operation, the controller 105 directs the hydraulic system 110 to provide the second flow (e.g., a reverse flow) of the fluid 314 through the housing 211. For example, the fluid 314 is conveyed (a) at a relatively high fluid pressure through the second channel 370 from the hydraulic system 110 to the second chamber 324 and (b) at a relatively low fluid pressure through the first channel 368 from the first chamber 320 to the hydraulic system 110. Accordingly, the resulting differential fluid pressure experienced by the piston 302 of FIG. 4 urges the piston 302 in the second direction 374 toward the first plate 316 such that the piston 302, the first plate 316, and/or a clutch pack 404 of the first clutch 312 generate the friction for the first clutch 312. In this manner, disclosed examples actuate the piston 302 of FIG. 4 to cause the first clutch 312 to transfer (e.g., via the clutch pack 404) the engine torque from the cover 202 to the first damper 313 and, consequently, to the second hub 310. Conversely, in such examples, to provide the first state of the first clutch 312 of FIG. 4 during the lockup off operation, the controller 105 directs the hydraulic system 110 to provide the first flow of the fluid 314. For example, the fluid 314 is conveyed (a) at a relatively high fluid pressure through the first channel 368 from the hydraulic system 110 to the first chamber 320 and (b) at a relatively low fluid pressure through the second fluid channel 370 from the second chamber 324 to the hydraulic system 110. Accordingly, the resulting fluid pressure differently experienced by the piston 302 of FIG. 5 urges the piston 302 in the first direction 372 away from the first plate 316, which causes the piston 302 to disengaged and/or separate from the first plate 316.

In some examples, both the first and second seals 304, 306 of FIG. 4 are configured to substantially maintain a differential fluid pressure that is experienced by the piston 302 during the lockup on operation of the torque converter 200 where the second fluid pressure associated with the second chamber 324 is greater than the first fluid pressure associated with the first chamber 320. Conversely, in such examples, the first seal 304 and/or the second seal 306 is/are configured to adjust (e.g., reduce) a differential fluid pressure experienced by the piston 302 during the lockup off operation where the first fluid pressure associated with the first chamber 320 is greater than the second fluid pressure associated with the second chamber 324, which is discussed in greater detail below in connection with FIGS. 9A, 9B, 11A, and 11B. In particular, in some such examples, each of the first seal 304 and/or the second seal 306 is a one-way seal whereby the fluid 314 is flowable thereacross from the first chamber 320 to the second chamber 324. In this manner, the seal(s) 304, 306 of FIG. 4 allow the fluid 314 to circulate through the housing 211 and the transmission system 104 during the lockup off operation.

According to the illustrated example of FIG. 4, the first orifice 402 is configured to leak the fluid 314 (i.e., provide a controlled flow of the fluid 314) between the first and second chambers 320, 324 during the lockup on operation to lubricate the first clutch 312. In such examples, the first orifice 402 conveys the fluid 314 from the second chamber 324 to the first chamber 320 when the first clutch 312 is in the second state thereof. As a result of such controlled leakage provided by the first orifice 402, the fluid 314 flows across the face 317 of the piston 302 and/or through the clutch pack 404 radially outward relative to the first axis 210, thereby lubricating the first clutch 312 during frictional engagement associated therewith. For example, the fluid 314 flows from an inner radial or proximal portion of the clutch pack 404 to an outer radial or distal portion of the clutch pack 404, for example, between the piston 302 and the first plate 316. In this manner, the first orifice 402 improves thermal capacity of the first clutch 312 of FIG. 4 by transferring heat away from the first clutch 312 via the fluid 314. Additionally, in some such examples, the first orifice 402 is sized, shaped, structured, and/or otherwise configured to limit a rate at which the fluid 314 flows between the first and second chambers 320, 324 during the lockup on operation, for example, to between about 0.3 L/min and about 1.5 L/min.

As shown in FIG. 4, the face 317 of the piston 302 is positioned at a third radius 406 relative to the first axis 210. As such, the third radius 406 of FIG. 4 corresponds to a facing diameter associated with the first clutch 312. Further, the first orifice 402 is positioned at a fourth radius 408 relative to the first axis 210. In some examples, the fourth radius 408 is less than the third radius 406, as shown in FIG. 4. That is, the first orifice 402 of FIG. 4 is positioned radially inward relative to the face 317 or the facing diameter. In other words, the first orifice 402 of FIG. 4 is positioned radially inward relative to the clutch pack 404.

Although FIG. 4 depicts a single orifice 402, in some examples, the assembly 300 is implemented differently. In such examples, the assembly 300 includes one or more other orifices (e.g., similar to the first orifice 402) positioned on the piston 302 in additional or alternatively to the first orifice 402 to provide such controlled leakage of the fluid 314. In such examples, the orifices 402 extend through the piston 302 and are radially distributed relative to the first axis 210.

The first seal 304 of FIG. 4 is configured to sealingly engage (a) an area of the outer surface 332 of the piston 302 at or adjacent the distal portion 328 and (b) an area of an inner surface 410 of the clutch pack 404, thereby forming the first fluid seal. Further, the second seal 306 of FIG. 4 is configured to sealingly engage (a) an area of the inner surface 340 of the piston 302 at or adjacent the proximal portion 336 and (b) and area of the outer surface 342 of the third hub 315, thereby forming the second fluid seal. As such, the second seal 306 of FIG. 4 is interposed between the piston 302 and the third hub 315. Further still, the third seal 382 of FIG. 4 is configured to sealingly engage (a) an area of the outer surface of the second hub 310 and (b) an area of the inner surface of the third hub 315.

Similar to the illustrated example of FIG. 3, the first seal groove 344 of FIG. 4 is formed and/or defined by the outer surface 332 of the piston 302. Further, the second seal groove 346 of FIG. 4 is formed and/or defined by the outer surface 342 of the third hub 315. Further, the third seal groove 384 of FIG. 4 is formed and/or defined by the second hub 310.

The clutch pack 404 of FIG. 4 includes multiple plates 316, 412, 414, 416 configured to engage each other to generate friction when the first clutch 312 is in the second state thereof or transitioning from the first state thereof to the second state thereof, four of which are shown in this example (i.e., the first plate 316, a second plate 412, a third plate 414, and a fourth plate 416). Additionally, to support the plates 316, 412, 414, 416, the clutch pack 404 also includes a first portion (e.g., an outer portion) 418 and a second portion (e.g., an inner portion) 420 rotatable relative to the first portion 418. In some examples, the first plate 316 and the third plate 414 are slidable along the first portion 418 of the clutch pack 404, for example, via a splined connection. Further, in some examples, the second plate 412 and the fourth plate 416 are similarly slidable along the second portion 420 of the clutch pack 404, for example, via a splined connection. In such examples, the clutch pack 404 of FIG. 4 includes a stopper 417 that is non-relatively rotatably (i.e., fixedly) coupled to the first or second portion 418, 420 of the clutch pack 404. In particular, the stopper 417 of FIG. 4 is not slidable along the first or second portion 418, 420 of the clutch pack 404 to limit movement of the clutch plate(s) 316, 412, 414, 416. As such, when squeezed or clamped by the piston 302 and the stopper 417 during the lockup on operation, the plates 316, 412, 414, 416 and/or, more generally, the clutch pack 404 generate(s) the friction for the first clutch 312.

The first portion 418 of the clutch pack 404 is non-relatively rotatably (i.e., fixedly) coupled to the cover 202, for example, via one or more fasteners and/or one or more fastening methods or techniques (e.g., via welding). As such, the cover 202 of FIG. 4 supports the first portion 418 of the clutch pack 404 and rotates together with the first portion 418 of the clutch pack 404 relative to the first axis 210. As shown in FIG. 4, the first portion 418 of the clutch pack 404 provides the surface 410 for engaging the first seal 304. Accordingly, the first seal 304 of FIG. 4 is interposed between the piston 302 and the first portion 418 of the clutch pack 404. Additionally, the second portion 420 of the clutch pack 404 is non-relatively rotatably (i.e., fixedly) coupled to the first damper portion 376, for example, via one or more fasteners (e.g., rivet(s)) 422 and/or one or more fastening methods or techniques. The first damper 313 of FIG. 3 is operatively interposed between the first clutch 312 and the turbine 309. Further, the second damper portion 378 of FIG. 3 is non-relatively rotatably (i.e., fixedly) coupled to the second shell 356, for example, via one or more fasteners and/or one or more fastening methods or techniques (e.g., welding).

As shown in FIG. 4, the first flange 366 of the second hub 310 extends away from the second hub 310 radially outward relative to the first axis 210 to receive and support the first damper portion 376 at or adjacent an end of the first flange 366. In particular, the first damper portion 376 is rotatable relative to the first flange 366. For example, an end of the first damper portion 376 is spaced from an end of the first flange 366 by a relatively small distance and/or engages (e.g., slidably engages) the end the first flange 366.

In addition or alternatively to the orifice(s) 402, in some examples, one or more (e.g., all) of the seal(s) 304, 306, 382 of FIG. 4 and/or the respective seal groove(s) 344, 346, 384 of FIG. 4 is/are sized, shaped, structured and/or otherwise configured to leak the fluid 314 (i.e., provide a controlled flow of the fluid 314) between the first and second chambers 320, 324 during the lockup on operation to lubricate the first clutch 312. In such examples, similar to the orifice(s) 402, one or more (e.g., all) of the seal(s) 304, 306, 382 and/or the respective seal groove(s) 344, 346, 384 is/are sized, shaped, structured, and/or otherwise configured to limit a rate at which the fluid 314 flows between the first and second chambers 320, 324 during the lockup on operation (e.g., to between about 0.3 L/min and about 1.5 L/min). That is, in such examples, the fluid 314 is flowable across the first seal 304, the second seal 306, and/or the third seal 382, at a substantially limited rate, from the second chamber 324 to the first chamber 320. To provide such controlled leakage, the seal(s) 304, 306, 382 are formed with particular geometries or shapes. Additionally or alternatively, to provide such controlled leakage, the seal groove(s) 344, 346, 384 are formed with particular geometries or shapes. Thus, according to one or more disclosed examples, such controlled leakage of the fluid 314 between the first and second chambers 320, 324 of FIG. 4 is enabled by means of the (a) the orifice(s) 402, the seal(s) 304, 306, 382, (b) the seal groove(s) 344, 346, 384, or (c) any combination thereof.

Figure 5:
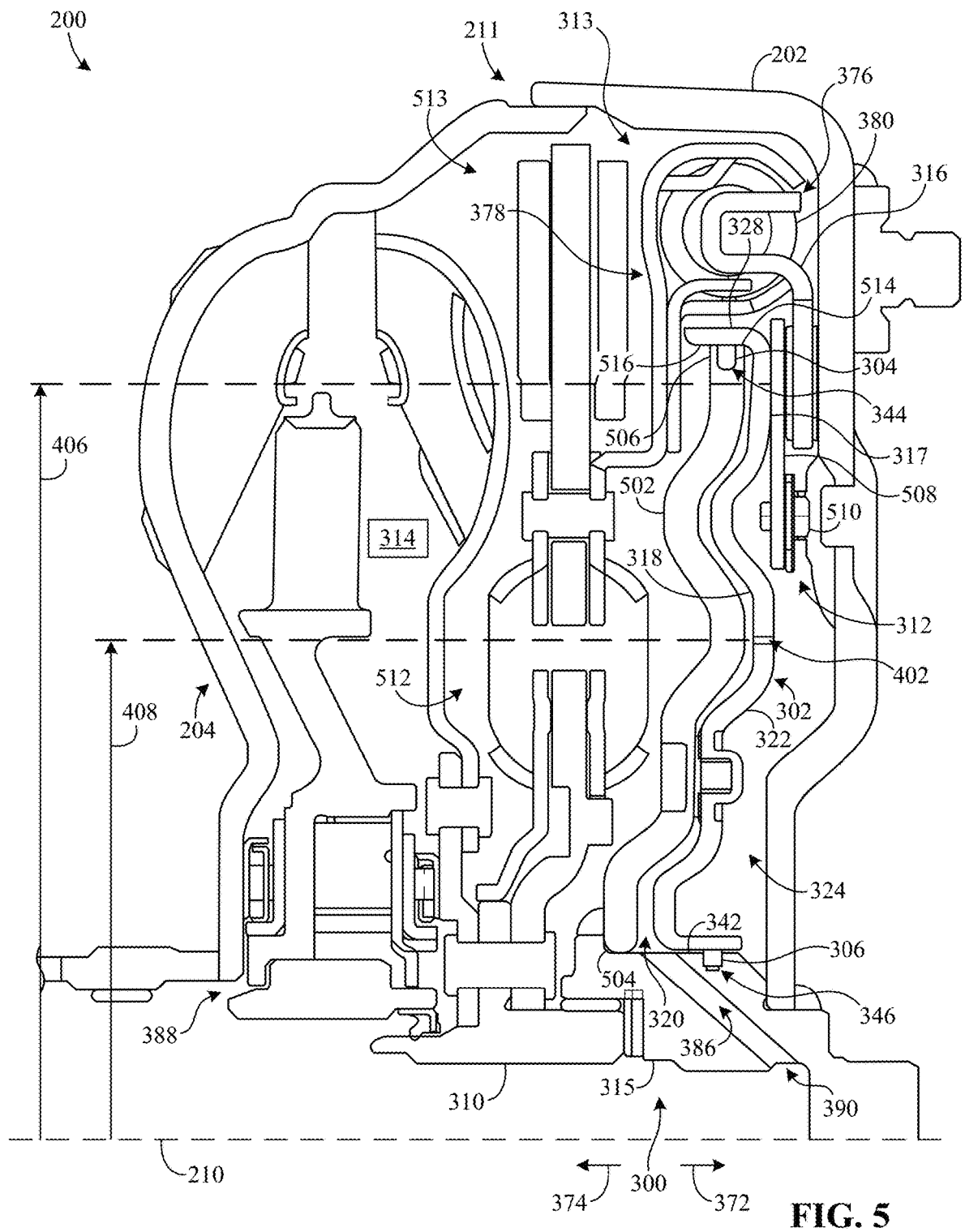
FIG. 5 is another partial cross-sectional view of the example torque converter of FIG. 2 along line A-A and shows an example assembly therein in accordance with the teachings of this disclosure.

FIG. 5 is another partial cross-sectional view of the torque converter 200 of FIG. 2 along line A-A and shows the assembly 300 therein. According to the illustrated example of FIG. 5, the assembly 300 includes the piston 302, the first seal 304, the second seal 306, and the first orifice 402. In particular, the torque converter 200 of FIG. 5 also includes a fifth plate 502 having an inner radial or proximal portion 504 that is positioned on the third hub 315. The fifth plate 502 of FIG. 5 is non-relatively rotatably (i.e., fixedly) coupled to the third hub 315, for example, via one or more fasteners and/or one or more fastening methods or techniques (e.g., via welding). In particular, the fifth plate 502 extends away from the third hub 315 radially outward relative to the first axis 210 to receive the distal portion 328 of the piston 302 at or adjacent a distal portion 506 of the fifth plate 502 opposite the proximal portion 504 of the fifth plate 502.

Additionally, the first clutch 312 of FIG. 5 also includes a sixth plate (e.g., a clutch plate) 508, which facilitates clutch engagement. The sixth plate 508 is non-relatively rotatably (i.e., fixedly) coupled to the cover 202. For example, the torque converter 200 of FIG. 5 also includes one or more fasteners (e.g., bolt(s), stud(s), nut(s), etc.) 510 configured to couple the cover 202 and the sixth plate 508 together in such a manner, one of which is shown in this example. In such examples, the fastener(s) 510 of FIG. 5, which may be radially distributed relative to the first axis 210, extend at least partially through the cover 202 and/or the sixth plate 508. In particular, the sixth plate 508 of FIG. 5 extends away from the fastener(s) 510 radially outward relative to the first axis 210 to receive or contact the face 317 of the piston 302. During the lockup on operation, the face 317 of the piston 302 is configured to engage (e.g., slidably engage) the sixth plate 508 to provide the second state of the first clutch 312 or transition the first clutch 312 from the first state thereof to the second state thereof. In such examples, the sixth plate 508 is at least partially flexible such that an outer radial or distal portion of the sixth plate 508 is movable relative to the fastener(s) 510 in the first direction 372 (and/or the second direction 374), which enables the sixth plate 508 and the cover 202 to squeeze or clamp the first plate 316 in response to actuation of the piston 302.

Unlike the illustrated example of FIG. 4, the first side 318 of the piston 302 of FIG. 5 forms and/or defines the first chamber 320 together with the fifth plate 502. Further, the second side 322 of the piston 302 of FIG. 4 forms and/or defines the second chamber 324 together with the cover 202 and the impeller 204 (i.e., the housing 211). In such examples, to provide the second state of the first clutch 312 during the lockup on operation, the controller 105 directs the hydraulic system 110 to provide the second flow of the fluid 314 through the housing 211. For example, the fluid 314 is conveyed (a) at a relatively high fluid pressure through the second channel 370 from the hydraulic system 110 to the first chamber 320 and (b) at a relatively low fluid pressure through the first channel 368 from the second chamber 324 to the hydraulic system 110. Accordingly, the resulting differential fluid pressure experienced by the piston 302 of FIG. 5 urges the piston 302 in the first direction 372 toward the sixth plate 508 such that the piston 302, the sixth plate 508, the first plate 316, and/or the cover 202 generate the friction for the first clutch 312. In this manner, disclosed examples actuate the piston 302 of FIG. 5 to cause the first clutch 312 to transfer the engine torque from the cover 202 to the first damper 313 and, consequently, to the second hub 310. Conversely, in such examples, to provide the first state of the first clutch 312 during the lockup off operation, the controller 105 directs the hydraulic system 110 to provide first flow of the fluid 314. For example, the fluid 314 is conveyed (a) at a relatively high fluid pressure through the first channel 368 from the hydraulic system 110 to the second chamber 324 and (b) at a relatively low fluid pressure through the second fluid channel 370 from the first chamber 320 to the hydraulic system 110. Accordingly, the resulting fluid pressure differently experienced by the piston 302 of FIG. 5 urges the piston 302 in the second direction 374 away from the sixth plate 508, which causes the piston 302 to disengaged and/or separate from the sixth plate 508.

Unlike the illustrated example of FIG. 4, the first seal groove 344 of FIG. 5 is formed and/or defined by an outer surface 514 of the fifth plate 502 at or adjacent the distal portion 506 of the fifth plate 502. As shown in FIG. 5, the distal portion 328 of the piston 302 extends and/or curves away from a central portion of the piston 302 past the distal portion 506 of the fifth plate 502. Accordingly, the first seal 304 sealingly engages the outer surface 514 of the fifth plate 502 and an inner surface 516 of the piston 302 at or adjacent the distal portion 328, thereby forming the first fluid seal. As such, the first seal 304 of FIG. 5 is interposed between the piston 302 and the fifth plate 502. On the other hand, similar to the illustrated example of FIG. 4, the second seal groove 346 of FIG. 5 is formed and/or defined by the outer surface 342 of the third hub 315.

According to the illustrated example of FIG. 5, the fluid 314 can enter and/or exit the first chamber 320 via the second opening 390. The second opening 390 of FIG. 5 is formed and/or defined only by the fourth fluid channel 386. Further, in such examples, the fluid 314 can enter and/or exit the second chamber 320 via the first opening 388.

According to the illustrated example of FIG. 5, the first damper portion 376 corresponds to and/or is implemented by the first plate 316. Additionally, in some examples, the torque converter 200 of FIG. 5 also includes a second damper (e.g., a spring damper) 512 and a third damper (e.g., a centrifugal pendulum absorber) 513 that is connected between the first damper 313 and the second damper 512. The second damper 512 is also connected to the second hub 310. In such examples, torque is transmittable through the second and third dampers 512, 513 from the second damper portion 378 to the second hub 310 during the lockup on operation of the torque converter 200.

In some examples, both the first and second seals 304, 306 of FIG. 5 are configured to substantially maintain the differential fluid pressure that is experienced by the piston 302 during a lockup on operation of the torque converter 200 where the first fluid pressure associated with the first chamber 320 is greater than the second fluid pressure associated with the second chamber 324. Conversely, the first seal 304 and/or the second seal 306 is/are configured to adjust (e.g., reduce) the differential fluid pressure experienced by the piston 302 during a lockup off operation of the torque converter 200 (e.g., after the lockup on operation) where the second fluid pressure associated with the second chamber 324 is greater than the first fluid pressure associated with the first chamber 320, which is discussed in greater detail below in connection with FIGS. 6, 7A, 7B, 9A, 9B, 11A, and 11B. In such examples, each of the first seal 304 and/or the second seal 306 is a one-way seal whereby the fluid 314 is flowable thereacross only from the second chamber 324 to the first chamber 320. In this manner, the seal(s) 304, 306 of FIG. 5 allow the fluid 314 to circulate through the housing 211 and the transmission system 104 during the lockup off operation.

According to the illustrated example of FIG. 5, the first orifice 402 (and/or the other orifice(s)) is configured to leak the fluid 314 (i.e., provide a controlled flow of the fluid 314) between the first and second chambers 320, 324 during the lockup on operation to lubricate the first clutch 312. In such examples, the first orifice 402 conveys the fluid 314 from the first chamber 320 to the second chamber 324 when the first clutch 312 is in the second state thereof. As a result of such controlled leakage provided by the first orifice 402, the fluid 314 flows across the face 317 of the piston 302 radially outward relative to the first axis 210, thereby lubricating the first clutch 312 during frictional engagement associated therewith. For example, the fluid 314 flows between (a) the piston 302 and the sixth plate 508, (b) the sixth plate 508 and the first plate 316, (c) the first plate 316 and the cover 202, (d) or any combination thereof. In this manner, the first orifice 402 improves thermal capacity of the first clutch 312 of FIG. 5 by transferring heat away from the first clutch 312 via the fluid 314. Additionally, in some such examples, the first orifice 402 is sized, shaped, structured, and/or otherwise configured to limit a rate at which the fluid 314 flows between the first and second chambers 320, 324 during the lockup on operation (e.g., to between about 0.3 L/min and about 1.5 L/min).

In addition or alternatively to the orifice(s) 402, in some examples, one or more (e.g., all) of the seal(s) 304, 306 of FIG. 5 and/or the respective seal groove(s) 344, 346 of FIG. 5 is/are sized, shaped, structured and/or otherwise configured to leak the fluid 314 (i.e., provide a controlled flow of the fluid 314) between the first and second chambers 320, 324 during the lockup on operation to lubricate the first clutch 312. In such examples, similar to the orifice(s) 402, one or more (e.g., all) of the seal(s) 304, 306 and/or the respective seal groove(s) 344, 346 is/are sized, shaped, structured, and/or otherwise configured to limit a rate at which the fluid 314 flows between the first and second chambers 320, 324 (e.g., to between about 0.3 L/m and about 1.5 L/m). That is, in such examples, the fluid 314 is flowable across the first seal 304 and/or the second seal 306, at a substantially limited rate, from the first chamber 320 to the second chamber 324. Thus, according to one or more disclosed examples, such controlled leakage of the fluid 314 between the first and second chambers 320, 324 of FIG. 5 is enabled by means of the (a) the orifice(s) 402, the seal(s) 304, 306 (*b*) the seal groove(s) 344, 346, or (c) any combination thereof.

As shown in FIG. 5, the face 317 of the piston 302 is positioned at the third radius 406 relative to the first axis 210. Further, the orifice(s) 402 are positioned at the fourth radius 408 relative to the first axis 210, which is less than the third radius 406 in this example.

According to the illustrated example of FIG. 5, the fourth fluid channel 386 extends through the third hub 315 radially outward or inward relative to the first axis 210 to fluidly couple the first chamber 320 to the second fluid channel 370 associated with the first shaft 208. Although FIG. 5 depicts a single fluid channel 386 associated with the conveying the fluid 314 between the first chamber 320 and the second fluid channel 370, in some examples, the assembly 300 is implemented differently. In such examples, the assembly 300 includes one or more other fluid channels (e.g., similar to the fourth fluid channel 386) in addition or alternatively to the fourth fluid channel 386 that are configured to convey the fluid 314 between the first chamber 320 and the second fluid channel 370. Further, in such examples, the fluid channel(s) 386 are radially distributed relative to the first axis 210.

Figure 6:
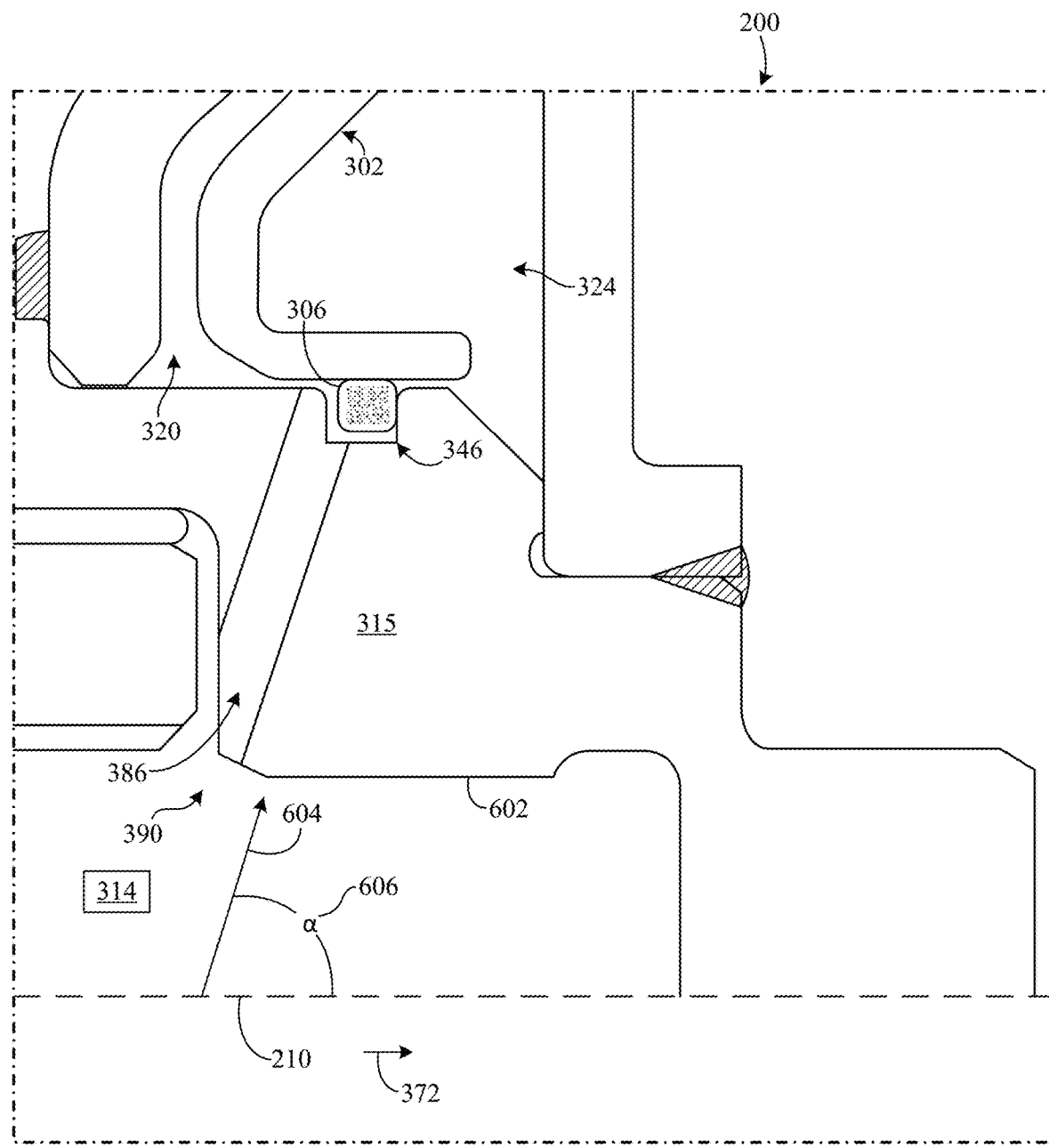
FIG. 6 is an enlarged portion view of the example torque converter of FIG. 5 and shows an example fluid channel in accordance with the teachings of this disclosure.

FIG. 6 is an enlarged portion view of the torque converter 200 of FIG. 5 and shows the fourth fluid channel 386. According to the illustrated example of FIG. 6, the fourth fluid channel 386 extends through the third hub 315 to the second seal groove 346. In particular, the second seal groove 346 fluidly couples the fourth fluid channel 386 to the first and second chambers 320, 324. In such examples, the fourth fluid channel 386 of FIG. 6 forms and/or defines at least a portion of the second seal groove 346. In particular, the fourth fluid channel 386 of FIG. 6 is sized, shaped, structured, and/or otherwise configured to provide one-way sealing functionality to the second seal 306, which is discussed further below in connection with FIGS. 7A and 7B. In such examples, the second seal 306 is movable in the second seal groove 346, for example, in response to the fluid 314 imparting force(s) on the second seal 306. More particularly, in such examples, movement of the second seal 306 is based on a flow direction of the fluid 314 through the fourth fluid channel 386 provided by the hydraulic system 110.

As shown in FIG. 6, the fourth fluid channel 386 is substantially linear or extends along a linear path. In some examples, the fourth fluid channel 386 extends away from an inner surface 602 of the third hub 315 in a third direction 604 having a component corresponding to the first direction 372. In such examples, the fourth fluid channel 386 is sloped and/or angled relative to the first axis 210. That is, the fourth fluid channel 386 and the first axis 210 form an angle 606, for example, that is between about 90 degrees and 45 degrees. In this manner, the fourth fluid channel 386 facilitates moving the second seal 306 in the first direction 372 when the fluid 314 is conveyed through the fourth channel 386 from the second fluid channel 370 to the second seal groove 346.

Figure 7A:
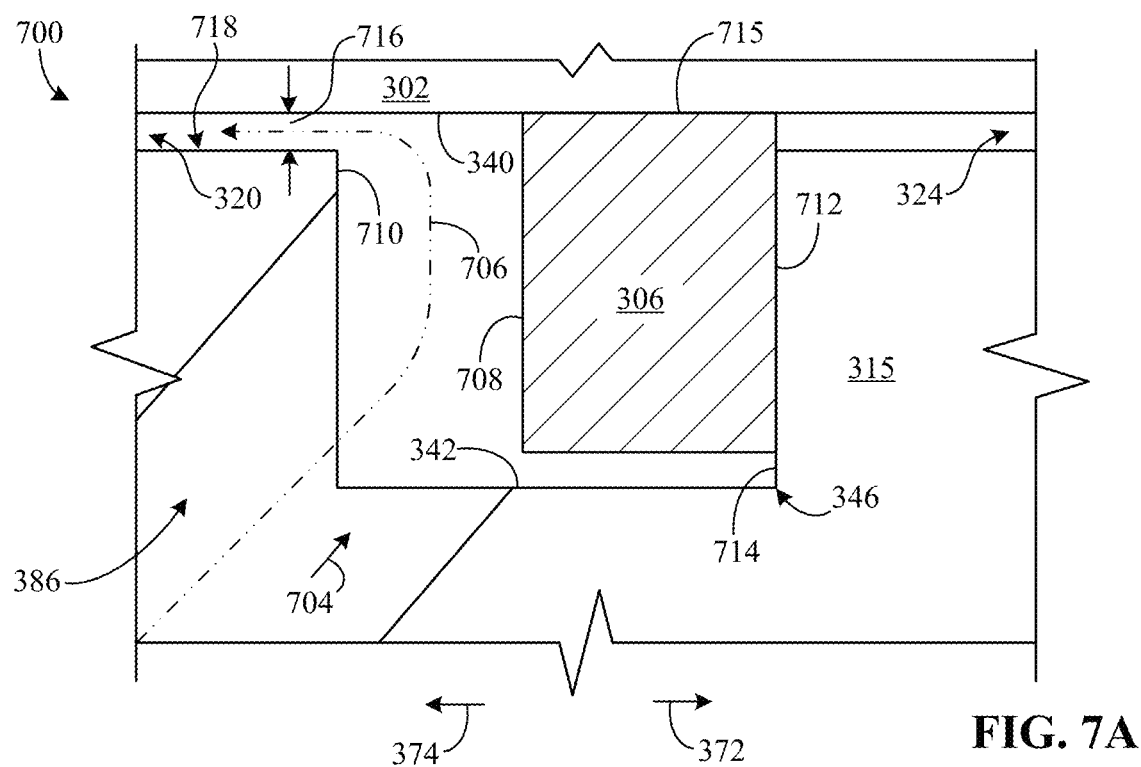
FIGS. 7A and 7B are other enlarged portion views of the example torque converter of FIG. 5 and show a first example seal configuration in accordance with the teachings of this disclosure.
Figure 7B:
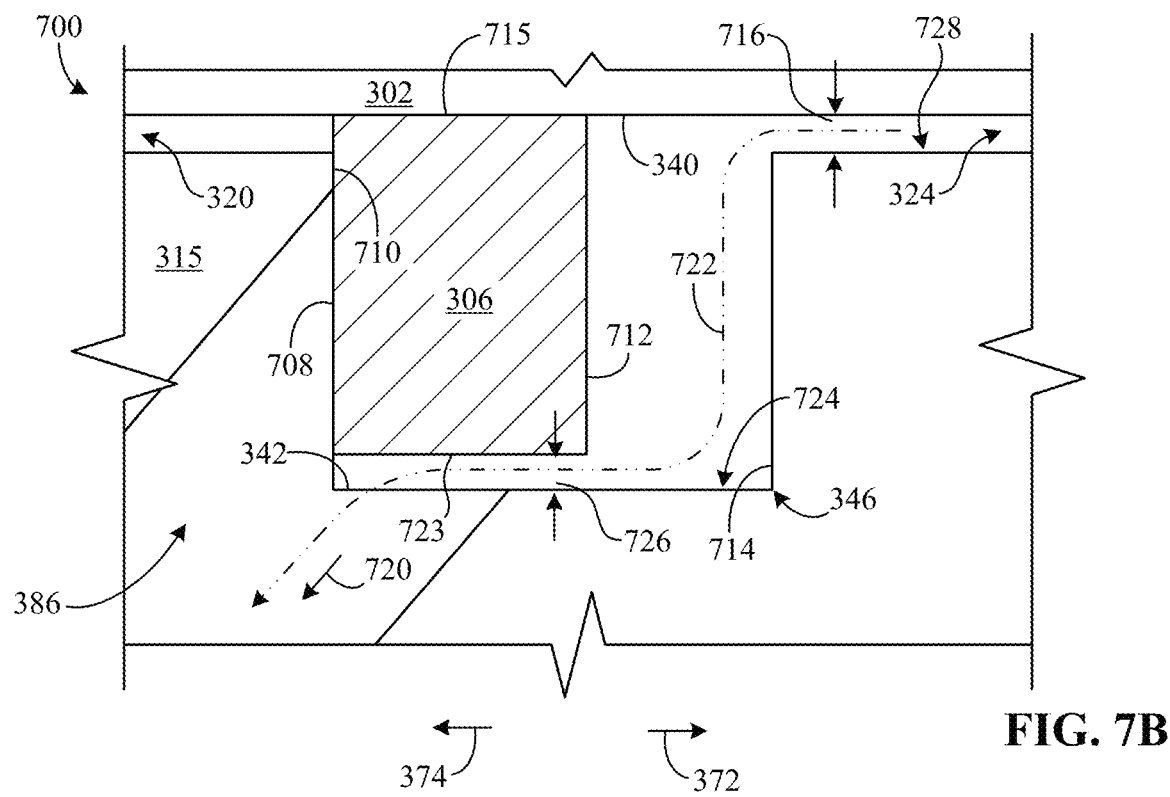

FIGS. 7A and 7B are other enlarged portion views of the torque converter 200 of FIG. 5 and show a first seal configuration (e.g., a one-way sealing configuration) 700 in accordance with the teachings of this disclosure. The first seal configuration 700 can be used to implement one or more of the seal(s) of the assembly 300 such as, for example, the second seal 306 of FIG. 5. In particular, the second seal 306 of FIGS. 7A and 7B is movable in the second seal groove 346 in the first direction 372 and/or the second direction 374 based on the flow direction of the fluid 314 through the fourth fluid channel 386, which changes the second fluid seal provided by the second seal 306.

According to the illustrated example of FIG. 7A, the second seal 306 is movable in the first direction 372 from a first position of the second seal 306 (shown in FIG. 7B) to a second position of the second seal 306 (shown in FIG. 7A) in response to the fluid 314 flowing in a fourth direction 704 through the fourth fluid channel 386 along a first path 706, for example, when the controller 105 initiates the lockup on operation and/or ceases the lockup off operation. The first path 706 is represented by the dotted/dashed line of FIG. 7A. For example, the second seal 306 experiences a differential fluid pressure caused by the fluid 314 flowing along the first path 706, which urges the second seal 306 in the first direction 372. In such examples, the fluid 314 imparts a force on a first side (e.g., a relatively flat, annular surface) 708 of the second seal 306, a component of which is directed in the first direction 372. As a result of such movement of the second seal 306, the first side 708 of the second seal 306 separates and/or sealingly disengages from a first side (e.g., a relatively flat, annular surface) 710 of the third hub 315 during the lockup on operation of the torque converter 200 when the first clutch 312 transitions from the first state thereof to the second state thereof. Then, as the second seal 306 continues moving in the first direction 372 toward the second position, a second side (e.g., a relatively flat, annular surface) 712 of the second seal 306 directly contacts and/or sealingly engages a second side (e.g., a relatively flat, annular surface) 714 of the third hub 315 opposite the first side 710 of the third hub 315. In such examples, the second seal 306 of FIG. 7A has an outer surface 715 that remains engaged with the inner surface 340 of the piston 302, for example, when the second seal 306 is in (a) the first position of the second seal 306, (b) the second position of the second seal 306, (c) or any position between the first and second positions of the second seal 306. The outer surface 715 of the second seal 306 corresponds to an outer diameter of the second seal 306. As shown in FIG. 7A, the first side 708 of the second seal 306 is opposite the second side 712 of the second seal 306. Further, the first and second sides 710, 714 of the third hub 315 face each other and at least partially form and/or define the second seal groove 346.

According the illustrated example of FIG. 7A, the second seal 306 prevents the fluid 314 from flowing between the second chamber 324 and the fourth fluid channel 386 (e.g., from the fourth fluid channel 386 to the second chamber 324) when the second seal 306 is in the second position thereof relative to the second seal groove 346. For example, the second seal 306 of FIG. 7A is sealingly engaged with the inner surface 340 of the piston 302 and the second side 714 of the third hub 315, thereby forming the second fluid seal. Instead, when in the second position, the second seal 306 of FIG. 7A urges the fluid 314 to flow between the first chamber 320 and the fourth fluid channel 386 (e.g., from the fourth fluid channel 386 to the first chamber 320) along the first path 706, which increases the first fluid pressure associated with the first chamber 320 for the orifice(s) 402. In particular, in such examples, the fluid 314 flows through a portion of a first gap 716 formed by the piston 302 and the third hub 315. That is, the fluid 314 flows between the inner surface 340 of the piston 302 and a first area 718 of the outer surface 342 of the third hub 315, where the first area 718 does not form and/or define the second seal groove 346 (e.g., the first area 718 is adjacent the second seal groove 346). In some examples, the first gap 716 substantially surrounds the third hub 315. In such examples, a size of the first gap 716 is substantially uniform or may vary along a length of the first gap 716.

According to the illustrated example of FIG. 7B, the second seal 306 of FIG. 7B is movable in the second direction 374 from the second position of the second seal 306 to the first position of the second seal 306 in response to the fluid 314 flowing in a fifth direction 720, opposite the fourth direction 704, through the fourth fluid channel 386 along a second path 722 different relative to the first path 706, for example, when the controller 105 initiates the lockup off operation and/or ceases the lockup on operation. The second path 722 is represented by the dotted/dashed line of FIG. 7B. For example, the second seal 306 experiences a differential fluid pressure caused by the fluid 314 flowing along the second path 722, which urges the second seal 306 in the second direction 374. In such examples, the fluid 314 imparts a force on the second side 712 of the second seal 306, a component of which is directed in the second direction 374. As a result of such movement of the second seal 306, the second side 712 of the second seal 306 separates and/or sealingly disengages from the second side 714 of the third hub 315 during the lockup off operation of the torque converter 200 when the first clutch 312 transitions from the second state thereof to the first state thereof. Then, as the second seal 306 continues moving in the second direction 374 toward the first position, the first side 708 of the second seal 306 directly contacts and/or sealingly engages the first side 710 of the third hub 315.

Additionally, the second seal 306 of FIG. 7B has an inner surface 723 that is spaced from a second area 724 of the outer surface 342 of the third hub 315 by a relatively small distance such that a second gap 726 is formed by the second seal 306 and the third hub 315. The inner surface 723 of the second seal 306 corresponds to an inner diameter of the second seal 306. Further, the second area 724 of the outer surface 342 of the third hub 315 forms and/or defines the second seal groove 346, for example, together with the first and second sides 710, 714 of the third hub 315. Additionally, in some examples, the second gap 726 substantially surrounds the third hub 315. In such examples, a size of the second gap 726 is substantially uniform or may vary along a length of the second gap 726. In other words, the second gap 726 of FIG. 7B is substantially maintained, for example, when the second seal 306 is in one of the (a) the first position of the second seal 306, (b) the second position of the second seal 306, (c) or any position between the first and second positions of the second seal 306. Further, the fourth fluid channel 386 of FIG. 7B, the first gap 716 of FIG. 7B, and the second gap 726 of FIG. 7B are sized, shaped, structured, and/or otherwise configured to provide a sufficient flow rate of the fluid 314 therethrough during the lockup off operation.

According the illustrated example of FIG. 7B, the second seal 306 prevents the fluid 324 from flowing between the first chamber 320 and the fourth fluid channel 386 (e.g., from the fourth fluid channel 386 to the first chamber 320) when the second seal 306 is in the first position thereof relative to the second seal groove 346. For example, the second seal 306 of FIG. 7B is sealingly engaged with the inner surface 340 of the piston 302 and the first side 710 of the third hub 315, thereby forming the second fluid seal. Instead, when in the first position, the second seal 306 of FIG. 7B urges the fluid 314 to flow between the second chamber 324 and the fourth fluid channel 386 (e.g., from the second chamber 324 to the fourth fluid channel 386) along the second path 722. In particular, in such examples, the fluid 314 flows through a different portion of the first gap 716 of FIG. 7B and the second gap 726 and across the second seal 306. In such examples, the fluid 314 flows between the inner surface 340 of the piston 302 and a third area 728 of the outer surface 342 of the third hub 315, where the third area 728 does not form and/or define the second seal groove 346 (e.g., the third area 728 is adjacent the second seal groove 346).

Thus, the second fluid seal formed by the second seal 306 of FIGS. 7A and 7B is based on the position (e.g., the first or second position) of the second seal 306 relative to the second seal groove 346. As such, the second fluid seal changes in response to movement of the second seal 306 relative to the second seal groove 346.

Figure 8:
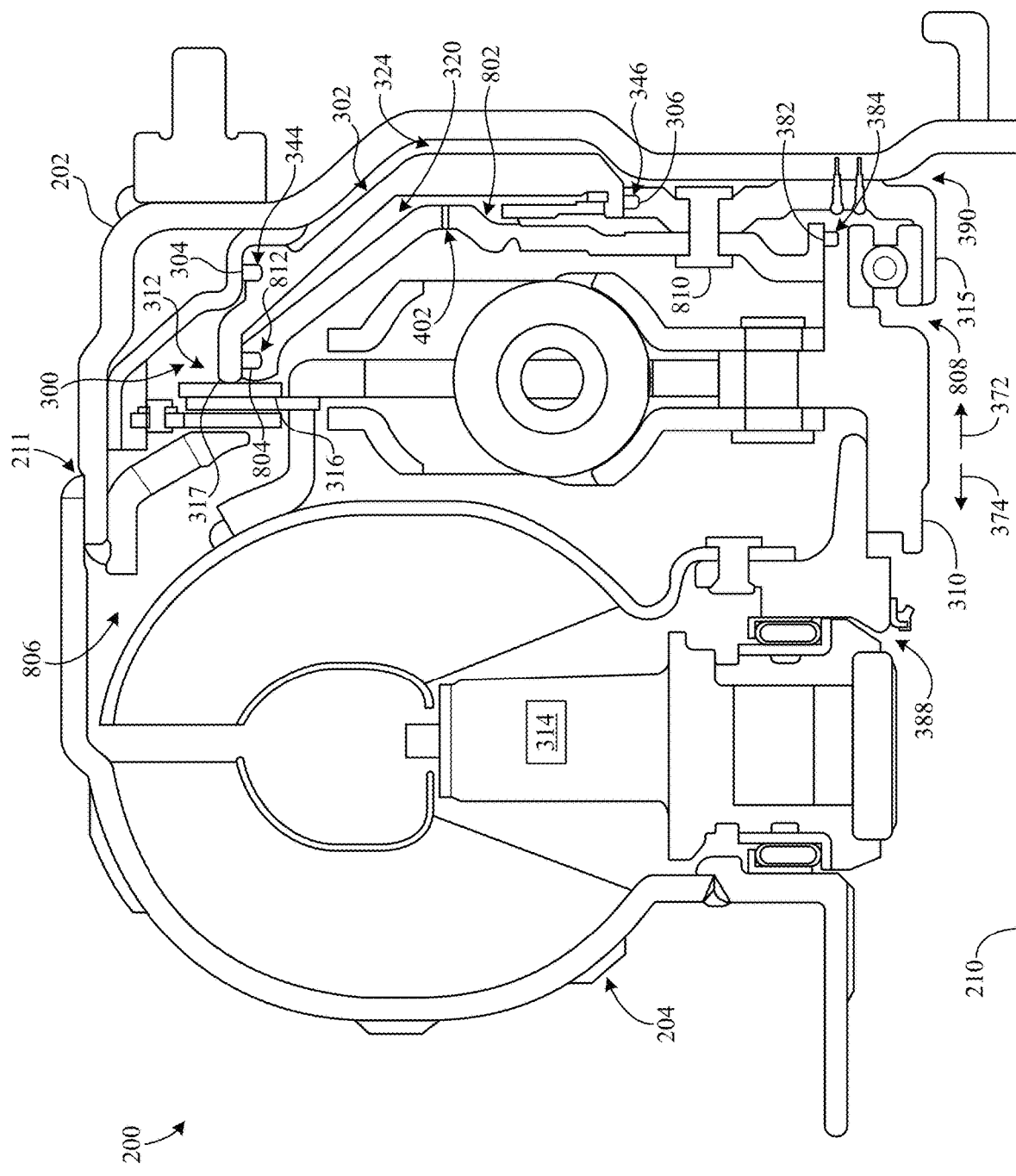
FIG. 8 is a partial cross-sectional view of the example torque converter of FIG. 2 along line A-A and shows an example assembly therein in accordance with the teachings of this disclosure.

FIG. 8 is another partial cross-sectional view of the torque converter 200 of FIG. 2 along line A-A and shows the assembly 300 therein. According to the illustrated example of FIG. 8, the first clutch 312 of FIG. 8 includes a seventh plate (e.g., a balance plate) 802 in the housing 211 adjacent the piston 302, which facilitates generating a differential fluid pressure that is applied and/or experienced by the piston 302 during the lockup on operation of the torque converter 200. In particular, the seventh plate 802 and the piston 302 are movably coupled together. That is, the piston 302 is movable relative to the seventh plate 802 in the first direction 372 and/or the second direction 374, for example, across a relatively small distance. Additionally, the assembly 300 of FIG. 8 also includes a fourth seal (e.g., a one-way seal) 804 operatively coupled to the piston 302 and/or the seventh plate 802.

According to the illustrated example of FIG. 8, the seventh plate 802 and the piston 302 form and/or define the first chamber 320. Further, the piston 302 and the cover 202 form and/or define the second chamber 324. Further still, the seventh plate 802 and the impeller 204 form and/or define a third chamber (e.g., a fluid chamber) 806.

In some examples, to allow the fluid 314 to enter and/or exit the housing 211, the assembly 300 also includes a fourth opening 808 positioned on the housing 211 in addition to the first and second openings 388, 390. The third opening 808 of FIG. 8 is formed and/or defined by the second and third hubs 310, 315. In particular, the fluid 314 is flowable through the first, second, and fourth openings 388, 390, 808 of FIG. 8, which enables the hydraulic system 110 to control the state of the first clutch 312 of FIG. 8. In such examples, the fluid 314 can enter and/or exit the first chamber 320 via the fourth opening 808. Further, the fluid 314 can enter and/or exit the second chamber 324 via the second opening 390. Further still, the fluid 314 can enter and/or exit the third chamber 806 via the first opening 388.

According to the illustrated example of FIG. 8, when the transmission system 104 and the torque converter 200 are assembled, the first opening 388 is in fluid communication with the first fluid channel 368. Further, in such examples, the second opening 390 is in fluid communication with the second fluid channel 370. Further still, in such examples, the fourth opening 808 is in fluid communication with the third fluid channel 371.

According to the illustrated example of FIG. 8, to provide the second state of the first clutch 312 of FIG. 8, the controller 105 directs the hydraulic system 110 to control the fluid 314 in the housing 211 such that the second fluid pressure associated with the second chamber 324 and a third fluid pressure associated with the third chamber 806 are both greater than the first fluid pressure associated with the first chamber 320. In particular, as a result of such control of the hydraulic system 110, the fluid 314 is conveyed (a) at a relatively high fluid pressure through the first and second fluid channels 368, 370 from the hydraulic system 110 to the respective second and third chambers 324, 806 and (b) at a relatively low fluid pressure through the third channel 371 from the second chamber 324 to the hydraulic system 110. In such examples, the third chamber 806 is sometimes referred to as a hydraulic pressure chamber. Accordingly, the resulting differential fluid pressure experienced by the piston 302 of FIG. 8 urges the piston 302 in the second direction 374 toward the first plate 316 such that the face 317 of the piston engages (e.g., slidably engages) the first plate 316.

The seventh plate 802 of FIG. 8 is non-relatively rotatably coupled to the third hub 315, for example, via one or more example fasteners (e.g., rivet(s)) 810 and/or one or more example fastening methods or techniques. As such, the seventh plate 802 and the third hub 315, together, are rotatable relative to the first axis 210.

According to the illustrated example of FIG. 8, to facilitate carrying the fourth seal 804, the assembly 300 of FIG. 8 also includes a fourth seal groove 812, which is positioned on the seventh plate 802 in this example. For example, the fourth seal groove 812 of FIG. 8 is formed and/or defined by an outer surface of the seventh plate 802 at or adjacent an end of the seventh plate 802. The fourth seal 804 of FIG. 8 is positioned in the fourth seal groove 812 and extends through the fourth seal groove 812. In particular, the fourth seal 804 is interposed between the piston 302 and the seventh plate 802. Further, as shown in FIG. 8, the first seal groove 344 is positioned on the piston 302. The first seal 304 of FIG. 8 is interposed between the piston 302 and the cover 202. Further still, as shown in FIG. 8, the second seal groove 346 is positioned on the third hub 315. The second seal 306 of FIG. 8 is interposed between the piston 302 and a portion of the third hub 315 supporting the piston 302. Further still, as shown in FIG. 8, the third seal groove 384 is positioned on a portion of the second hub 310 supporting the seventh plate 802. The third seal 382 of FIG. 8 in interposed between the second hub 310 and the seventh plate 802.

As shown in FIG. 8, the first orifice 402 (and/or the one or more other orifice(s)) of FIG. 8 is positioned on the seventh plate 802. That is the first orifice 402 extends through the seventh plate 802 to fluidly couple the first and third chambers 320, 806 together. According to the illustrated example of FIG. 8, the first orifice 402 is configured to leak the fluid 314 (i.e., provide a controlled flow of the fluid 314) between the first and third chambers 320, 806 during the lockup on operation. In such examples, the first orifice 402 conveys the fluid 314 from the third chamber 806 to the first chamber 320 when the first clutch 312 is in the second state thereof.

In some examples, each of the first seal 304 of FIG. 8, the second seal 306 of FIG. 8, the third seal 382 of FIG. 8, and/or the fourth seal 804 of FIG. 8 is a one-way seal whereby the fluid 314 is flowable thereacross in a single direction, which is discussed in greater detail below in connection with FIGS. 9A, 9B, 11A, and 11B. As a result, in examples where the torque converter 200 is a four-pass torque converter, one of the first seal 304, the second seal 306, the third seal 382, the fourth seal 804, or a combination thereof converts the torque converter 200 to a three-pass torque converter, as shown in FIG. 8. Accordingly, the torque converter 200 of FIG. 8 is configured for use with a three-pass transmission system.

Figure 9A:
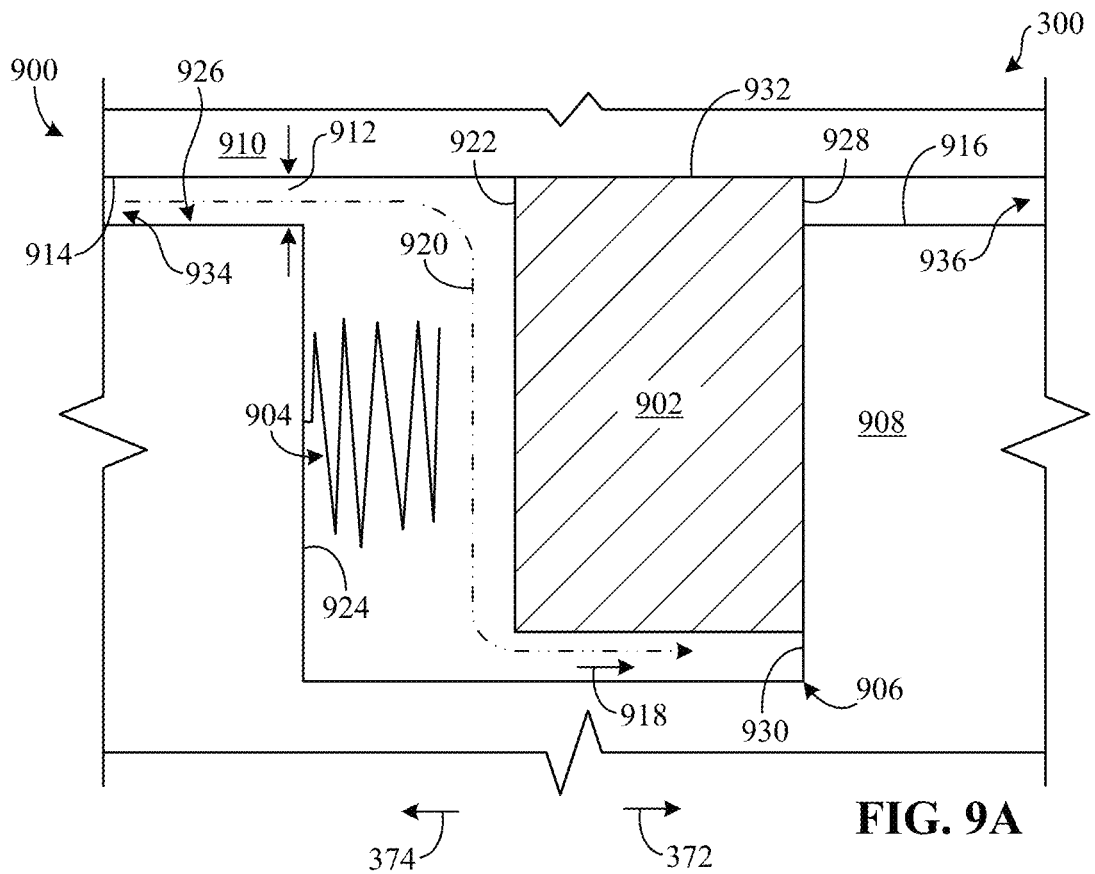
FIGS. 9A and 9B are partial views of a second example seal configuration for use with an example torque converter in accordance with the teachings of this disclosure.
Figure 9B:
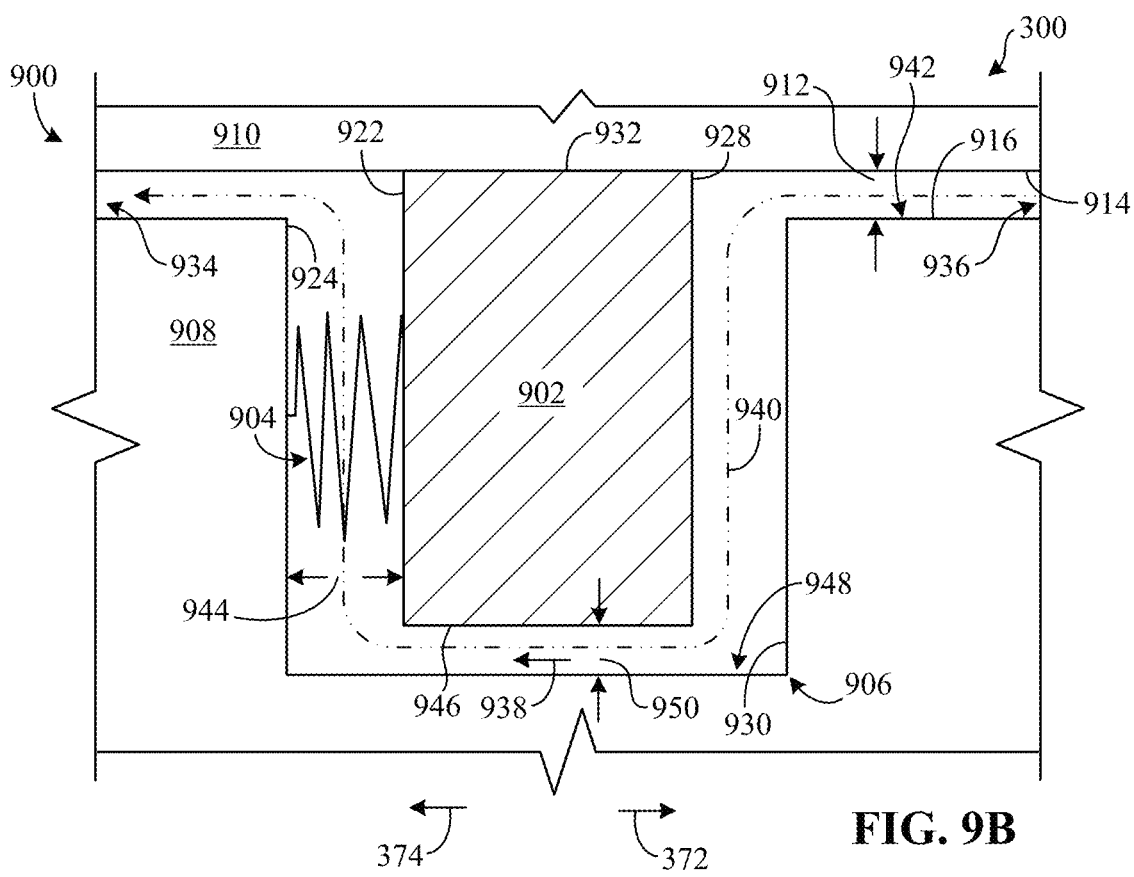

FIGS. 9A and 9B are partial views of a second seal configuration (e.g., a one-way sealing configuration) 900 for use with the torque converter 200 in accordance with the teachings of this disclosure. The second seal configuration 900 can be used to implement one or more of the seal(s) of the assembly 300 such as, for example, one of (a) the first seal 304, (b) the second seal 306, (c) the third seal 382, (d) the fourth seal 804, (e) one or more different seals, or (f) any combination thereof. According to the illustrated examples of FIGS. 9A and 9B, the assembly 300 includes a fifth seal (e.g., a one-way seal) 902 and an elastic member (e.g., a spring) 904 positioned adjacent the fifth seal 902, which facilitates one-way sealing operation associated with the fifth seal 902. The fifth seal 902 is positioned in a fifth seal groove 906 that is formed and/or defined by a first torque converter component 908 adjacent a second torque converter component 910. In some examples, the first torque converter component 908 corresponds to and/or is implemented by one of (a) the piston 302, (b) the second hub 310, (c) the third hub 315, (d) the fifth plate 502, (e) the seventh plate 802, or (f) any other suitable component of the torque converter 200. Further, in some examples, the second torque converter component 910 corresponds to and/or is implemented by one of (a) the cover 202, (b) the piston 302, (c) the third hub 315, (d) the first portion 418 of the clutch pack 404, (e) the seventh plate 802, or (f) any other suitable component of the torque converter 200. As shown in FIGS. 9A and 9B, the first and second torque converter components 908, 910 form and/or define a third gap 912. For example, an inner surface 914 of the second torque converter component 910 is spaced by a relatively small distance from an outer surface 916 of the first torque converter component 908. In particular, the fifth seal 902 of FIGS. 9A and 9B is movable in the fifth seal groove 906 in the first direction 372 and/or the second direction 374 based on a flow direction of the fluid 314 through the fifth seal groove 906 and/or the third gap 912, which changes a fifth fluid seal provided by the fifth seal 902.

According to the illustrated example of FIG. 9A, the fifth seal 902 is movable in the first direction 372 from a first position of the fifth seal 902 (shown in FIG. 9B) to a second position of the fifth seal 902 (shown in FIG. 9A) in response to the fluid 314 flowing in a sixth direction 918 through the fifth seal groove 906 along a third path 920, for example, when the controller 105 initiates the lockup on operation and/or ceases the lockup off operation. The third path 920 is represented by the dotted/dashed line of FIG. 9A. For example, the fifth seal 902 experiences a differential fluid pressure caused by the fluid 314 flowing along the third path 920, which urges the second seal 306 in the first direction 372. In such examples, the fluid 314 imparts a force on a first side (e.g., a relatively flat, annular surface) 922 of the fifth seal 902, a component of which is directed in the first direction 372. As a result of such movement of the fifth seal 902, the first side 922 of the fifth seal 902 moves away from a first side (e.g., a relatively flat, annular surface) 924 of the first torque converter component 908 and/or the elastic member 904 during the lockup on operation when the first clutch 312 transitions from the first state thereof to the second state thereof. The elastic member 904 may decompress due to the fifth seal 902 moving the first direction 372. In such examples, the fluid 314 flows through the third gap 912 and into the fifth seal groove 906. That is, the fluid 314 flows between the inner surface 914 of the second torque converter component 910 and a first area 926 of the outer surface 916 of the first torque converter component 908, where the first area 926 does not form the fifth seal groove 906 (i.e., the first area 926 is adjacent the fifth seal groove 906). Then, as the fifth seal 902 continues moving in the first direction 372 toward the second position, a second side (e.g., a relatively flat, annular surface) 928 of the fifth seal 902 directly contacts and/or sealingly engages a second side (e.g., a relatively flat, annular surface) 930 of the first torque converter component 908 opposite the first side 924 of the first torque converter component 908. In such examples, the fifth seal 902 of FIG. 9A has an outer surface 932 that remains engaged with the inner surface 914 of the second torque converter component 910, for example, when the fifth seal 902 is in (a) the first position of the fifth seal 902, (b) the second position of the second seal 306, (c) or any position between the first and second positions of the fifth seal 902.

According the illustrated example of FIG. 9A, the fifth seal 902 prevents the fluid 324 from flowing between a fourth chamber 934 and a fifth chamber 936 (e.g., from the fourth chamber 934 to the fifth chamber 936) when the fifth seal 902 is in the second position thereof relative to the fifth seal groove 906. For example, the fifth seal 902 of FIG. 9A is sealingly engaged with the inner surface 914 of the second torque converter component 910 and the second side 928 of the first torque converter component 908, thereby forming the fifth fluid seal. That is, when in the second position, the fifth seal 902 of FIG. 9A ceases the flow of the fluid 314 across the fifth seal 902, which increases a fourth fluid pressure associated with the fourth chamber 934 during the lockup on operation.

The third gap 912 of FIG. 9A is sized, shaped, structured, and/or otherwise configured to provide a sufficient flow rate of the fluid 314 therethrough during the lockup on operation. Additionally, in some examples, the third gap 912 substantially surrounds the first torque converter component 908. In such examples, a size of the third gap 912 is substantially uniform or may vary along a length of the third gap 912.

According to the illustrated example of FIG. 9B, the fifth seal 902 of FIG. 9B is movable in the second direction 374 from the second position of the fifth seal 902 to the first position of the fifth seal 902 in response to the fluid 314 flowing in a seventh direction 938, opposite the sixth direction 918, through the fifth seal groove 906 along a fourth path 940 different relative to the third path 920, for example, when the controller 105 initiates the lockup off operation and/or ceases the lockup on operation. The fourth path 940 is represented by the dotted/dashed line of FIG. 9B. For example, the fifth seal 902 experiences a differential fluid pressure caused by the fluid 314 flowing along the fourth path 940, which urges the second seal 306 in the second direction 374. In such examples, the fluid 314 imparts a force on the second side 928 of the fifth seal 902, a component of which is directed in the second direction 374. As a result of such movement of the fifth seal 902, the second side 928 of the fifth seal 902 separates and/or sealingly disengages from the second side 930 of the first torque converter component 908 during the lockup off operation of the torque converter 200 when the first clutch 312 transitions from the second state thereof to the first state thereof. In such examples, the fluid 314 flows through the third gap 912 of FIG. 9B and into the fifth seal groove 906. That is, the fluid 314 flows between the inner surface 914 of the second torque converter component 910 and a second area 942 of the outer surface 916 of the first torque converter component 908, where the second area 942 does not form the fifth seal groove 906 (i.e., the second area 942 is adjacent the fifth seal groove 906). Then, as the fifth seal 902 continues moving in the second direction 374 toward the first position, the first side 922 of the fifth seal 902 directly contacts the elastic member 904 and/or changes a state of the elastic member 904 (e.g., compresses the elastic member 904).

In some examples, the elastic member 904 is configured to urge the fifth seal 902 away from the first side 924 of the first torque converter component 908 and/or toward the second side 930 of the fifth seal groove 906 to provide a fourth gap 944. The fourth gap 944 of FIG. 9B is between the first side 924 of the fifth seal groove 906 and the first side 922 of the fifth seal 902. For example, the fifth seal 902 at least partially compresses the elastic member 904 during the lockup off operation in response to the fifth seal 902 moving to or toward the first position of the fifth seal 902. As a result such compression, the elastic member 904 imparts a biasing force on the first side 922 of the fifth seal 902, a component of which is directed in the first direction 372.

Additionally, the fifth seal 902 of FIG. 9B has an inner surface 946 that is spaced from a third area 948 of the outer surface 916 of the first torque converter component 908 by a relatively small distance such that a second a fifth gap 950 is formed by the fifth seal 902 and the first torque converter component 908. The inner surface 946 of the fifth seal 902 corresponds to an inner diameter of the fifth seal 902. Further, this third area 948 forms and/or defines the fifth seal groove 906, for example, together with the first and second sides 924, 930 of the first torque converter component 908. Additionally, in some examples, the fifth gap 950 substantially surrounds the first torque converter component 908. In such examples, a size of the fifth gap 950 is substantially uniform or may vary along a length of the fifth gap 950. In other words, the fifth gap 950 of FIG. 9B may be substantially maintained, for example, when the fifth seal 902 is in one of the (a) the first position of the fifth seal 902, (b) the second position of the fifth seal 902, (c) or any position between the first and second positions of the fifth seal 902. Further, the third gap 912 of FIGS. 9A and 9B, the fourth gap 944 of FIG. 9B, and the fifth gap 950 of FIG. 9B are sized, shaped, structured, and/or otherwise configured to provide a sufficient flow rate of the fluid 314 therethrough during the lockup off operation.

According the illustrated example of FIG. 9B, the fifth seal 902 and the elastic member 904 allow a flow the fluid 324 between the fourth chamber 934 and the fifth chamber 936 (e.g., from the fifth chamber 936 to the fourth chamber 934) when the fifth seal 902 is in the first position thereof relative to the fifth seal groove 906. That is, during the lockup off operation, the fluid 314 flows through the third, fourth, and fifth gaps 912, 944, 950 and across the fifth seal 902.

Thus, the fifth fluid seal formed by the fifth seal 902 is based on the position (e.g., the second position) of the second seal 306 relative to the second seal groove 346. As such, the fifth fluid seal changes in response to movement of the fifth seal 902 relative to the second seal groove 346. In particular, the fifth fluid seal exists when the fifth seal 902 is in or near the second position of the fifth seal 902 but not when the fifth seal 902 is in or near the second position of the fifth seal 902.

Although FIGS. 9A and 9B depict aspects in connection with the fifth seal 902, in some examples, such aspects likewise apply to any one or more (e.g., all) of the seal(s) of the assembly 300 such as, for example, (a) the first seal 304, (b) the second seal 306, (c) the third seal 382, (d) the fourth seal 804, (e) one or more different seals, or (f) any combination thereof.

Figure 10:
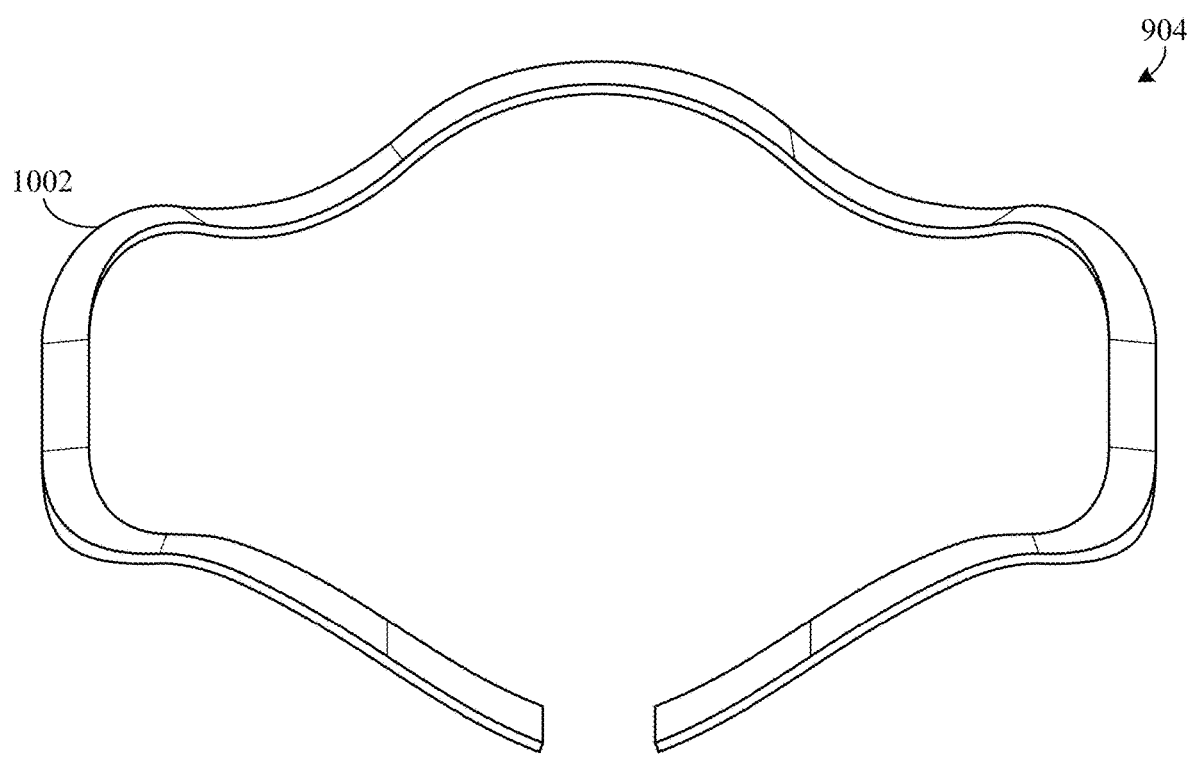
FIG. 10 is a view of an example elastic member in accordance with the teachings of this disclosure.

FIG. 10 is a view of the elastic member 904. According to the illustrated example of FIG. 10, the elastic member 904 is a wave washer or wave spring. As shown in FIG. 10, the elastic member 904 includes a body 1002 that is annularly shaped. The body 1002 of FIG. 10 is constructed of one or more materials having sufficient properties and/or characteristics (e.g., one or more of rigidity, elasticity, durability, etc.) associated therewith such as, for example, one or more of metal, plastic, rubber, etc. Additionally, in some examples, the body 1002 of the elastic member 904 forms and/or defines one or more bends and/or curvatures, which facilitate generating the biasing force for the fifth seal 902 and providing the fourth gap 944. Although FIG. 10 depicts the wave spring or wave washer, in some examples, the elastic member 904 is implemented differently, for example, using a snap ring or any other suitable elastic member able to provide the biasing force for the fifth seal 902.

Figure 11A:
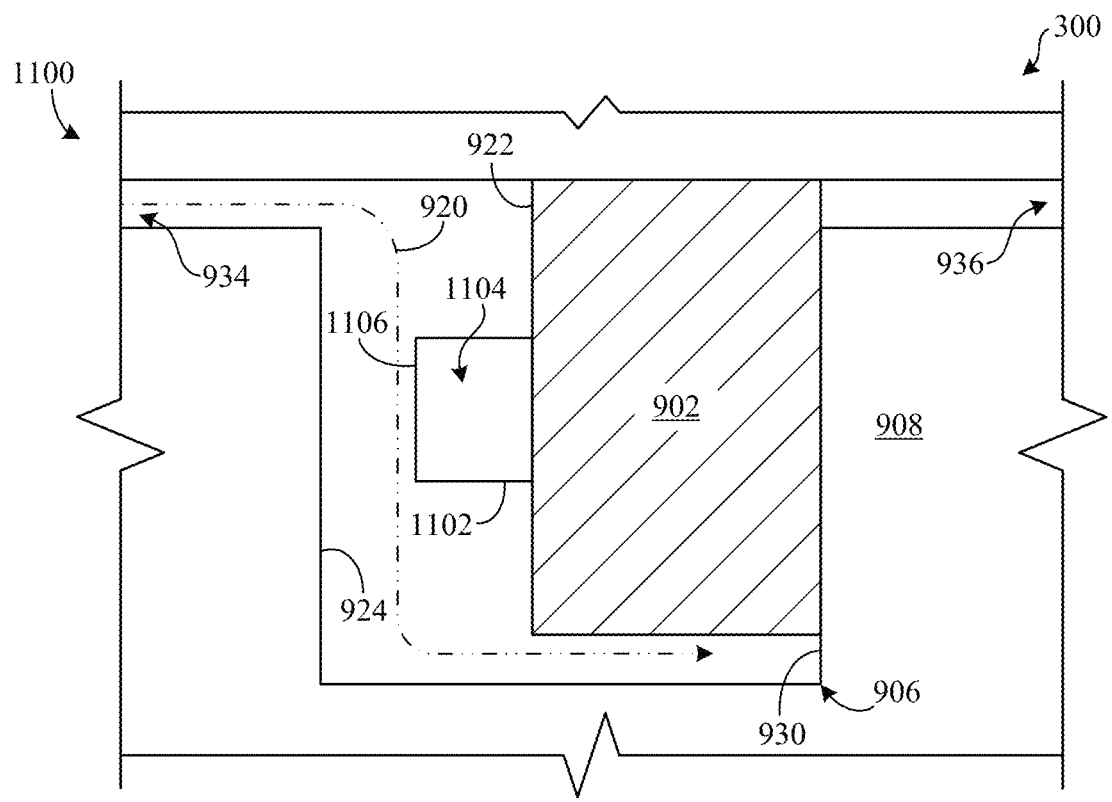
FIGS. 11A and 11B are partial views of a third example seal configuration for use with an example torque converter in accordance with the teachings of this disclosure.
Figure 11B:
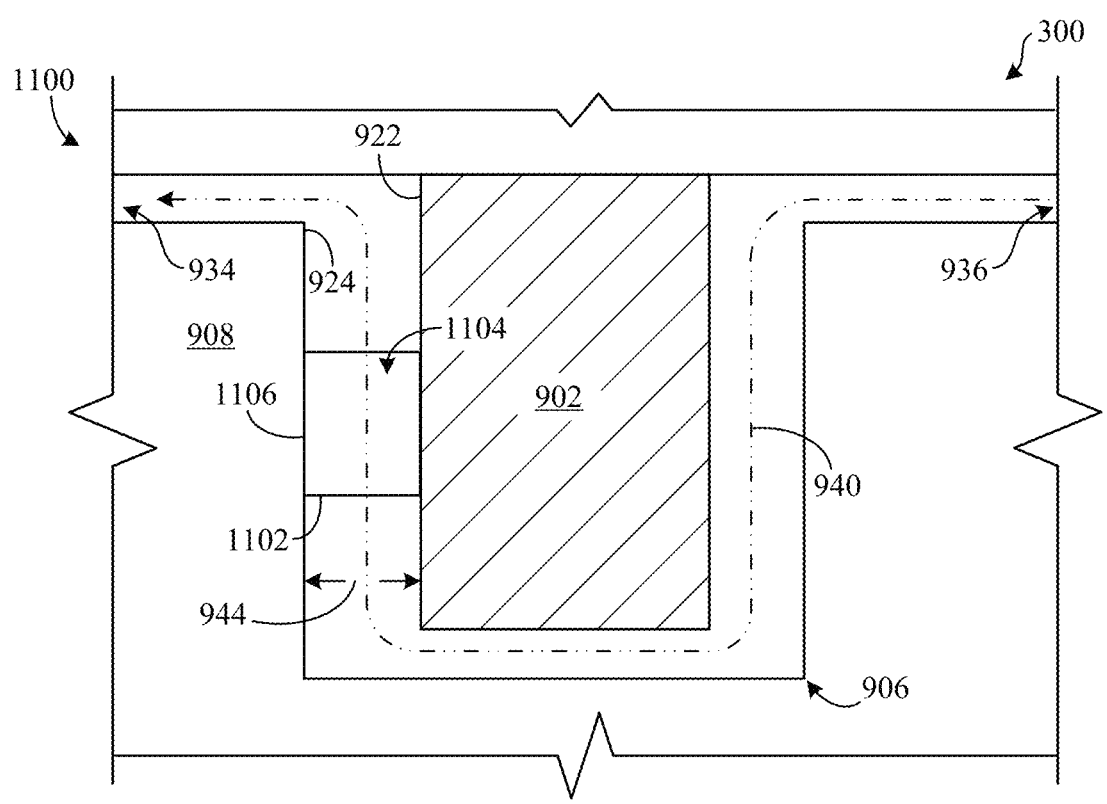

FIGS. 11A and 11B are partial views of a third seal configuration (e.g., a one-way sealing configuration) 1100 for use with the torque converter 200 in accordance with the teachings of this disclosure. The third seal configuration 1100 can be used to implement one or more of the seal(s) of the assembly 300 such as, for example, one of (a) the first seal 304, (b) the second seal 306, (c) the third seal 382, (d) the fourth seal 804, (e) the fifth seal 902, or (f) one or more different seals, or (f) any combination thereof. According to the illustrated examples of FIGS. 11A and 11B, the assembly 300 includes a protrusion (e.g., an annular protrusion) 1102 positioned on the first side 922 of the fifth seal 902, which facilitates one-way sealing operation associated with the fifth seal 902. The third seal configuration 1100 is similar to the second seal configuration 900. However, instead of the elastic member 904, the protrusion 1102 is sized, shaped, structured, and/or otherwise configured to allow the fluid 314 to flow between the fourth and fifth chambers 934, 936 and across the fifth seal 902 (e.g., during the lockup off operation).

In some examples, the protrusion 1102 is formed and/or defined by the fifth seal 902. That is, in such examples, the protrusion 1102 and the fifth seal 902 share a cross-sectional area. However, in other examples, the protrusion 1102 is a separate component from the fifth seal 902 and configured to non-relatively rotatably (i.e., fixedly) coupled to the fifth seal 902, for example, via one or more fasteners and/or one or more fastening methods or techniques. Additionally, in some examples, the protrusion 1102 is discontinuous, which facilities flowing the fluid 314 past the protrusion 1102. In such examples, the protrusion 1102 includes one or more openings 1104 extending through the protrusion 1102, one of which is shown in this example.

According to the illustrated example of FIG. 11A, a side (e.g., a relatively flat, annular surface) 1106 of the protrusion 1102 disengages and/or moves away from the first side 924 of the first torque converter component 908 in response to the fifth seal 902 experiencing the differential fluid pressure caused by the fluid 314 flowing along the third path 920 during the lockup on operation. In particular, when the fifth seal 902 is in the second position thereof relative to the fifth seal groove 906, the fifth seal 902 prevents the fluid 324 from flowing between the fourth and fifth chambers 934, 936.

According to the illustrated example of FIG. 11B, the side 1106 of the protrusion 1102 engages and/or directly contacts the first side 924 of the first torque converter component 908 in response to the fifth seal 902 experiencing the differential fluid pressure caused by the fluid 314 flowing along the fourth path 940. In particular, when the fifth seal 902 is in the first position thereof relative to the fifth seal groove 906, the fluid 314 flows through the opening(s) 1104 and across the fifth seal 902 between the fourth and fifth chambers 934, 936 during the lockup off operation. In such examples, the protrusion 1102 maintains the fourth gap 944 while the first clutch 312 is in the first state thereof. Although FIGS. 11A and 11B depict aspects in connection with the fifth seal 902, in some examples, such aspects likewise apply to any one or more (e.g., all) of the seal(s) of the assembly 300 such as, for example, (a) the first seal 304, (b) the second seal 306, (c) the third seal 382, (d) the fourth seal 804, (e) one or more different seals, or (f) any combination thereof.

Figure 12:
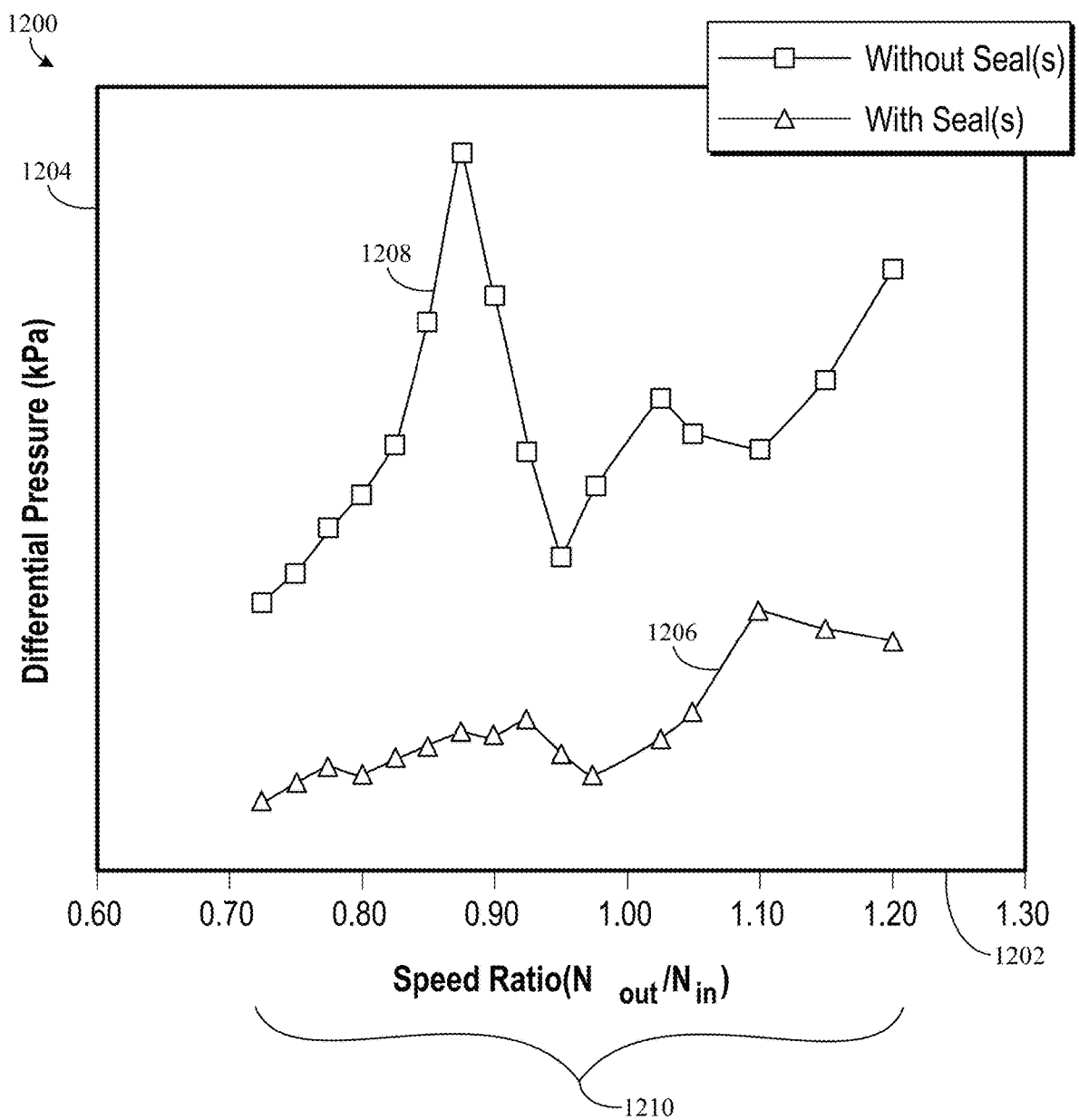
FIGS. 12-16 illustrate graphs showing example data associated with torque converter operation.

FIG. 12 illustrates a first graph 1200 showing example data associated with operation of the torque converter 200 of FIG. 3. According to the illustrated example of FIG. 12, the first graph 1200 includes a first axis (e.g., an x-axis) 1202 that corresponds to a speed ratio associated with the torque converter 200, for example, defined by the second hub 310 and the cover 202. For example, the first axis 1202 of FIG. 12 represents an angular speed of the cover 202 relative to an angular speed of the second hub 310. The graph 1200 of FIG. 12 also includes a second axis (e.g., a y-axis) 1204, perpendicular to the first axis 1202, that corresponds to a differential fluid pressure (e.g., in kilopascals (kPa)), for example, experienced by the piston 302 during the lockup on operation of the torque converter 200.

The graph 1200 of FIG. 12 also includes a first plot 1206 corresponding to the lockup on operation of the torque converter 200 of FIG. 3 when the torque converter 200 is converted from a three-pass torque converter to a two-pass torque converter via at least one one-way seal 304, 306, 382 of the assembly 300. In particular, the first plot 1206 represents a magnitude or degree of the differential fluid pressure that causes the first clutch 312 to change from the first state thereof to the second state thereof as the speed ratio increases. In other words, the first plot 1206 represents a minimum or threshold differential fluid pressure needed to initiate the slipping of the first clutch 312 via actuation of the piston 302.

On the other hand, the graph 1200 also includes a second plot 1208 corresponding to a lockup on operation of an example two-pass torque converter implemented in the vehicle 100. That is, the two-pass torque converter is implemented without any of the seal(s) of the assembly 300. Similar to the first plot 1206, the second plot 1208 of FIG. 12 represents the magnitude or degree of the differential fluid pressure that causes a lockup clutch of the two-pass torque converter to change from a disengaged state of the lockup clutch to an engaged state of the lockup clutch as the speed ratio increases. As shown in FIG. 12, the differential fluid pressure associated with the first plot 1206 is substantially lower compared to the differential fluid pressure associated with the second plot 1208 across a range 1210 of speed ratios. The range 1210 is between about 0.7 and about 1.2. Thus, the minimum or threshold differential fluid pressure associated with the first clutch 312 is relatively low when the torque converter 200 is implemented with the seal(s) 304, 306, 382 of the assembly 300. That is, sensitivity of the first clutch 312 increases due to the seal(s) 304, 306, 382. As a result, the seal(s) 304, 306, 382 improve response of the first clutch 312 and/or slip control thereof.

Figure 13:
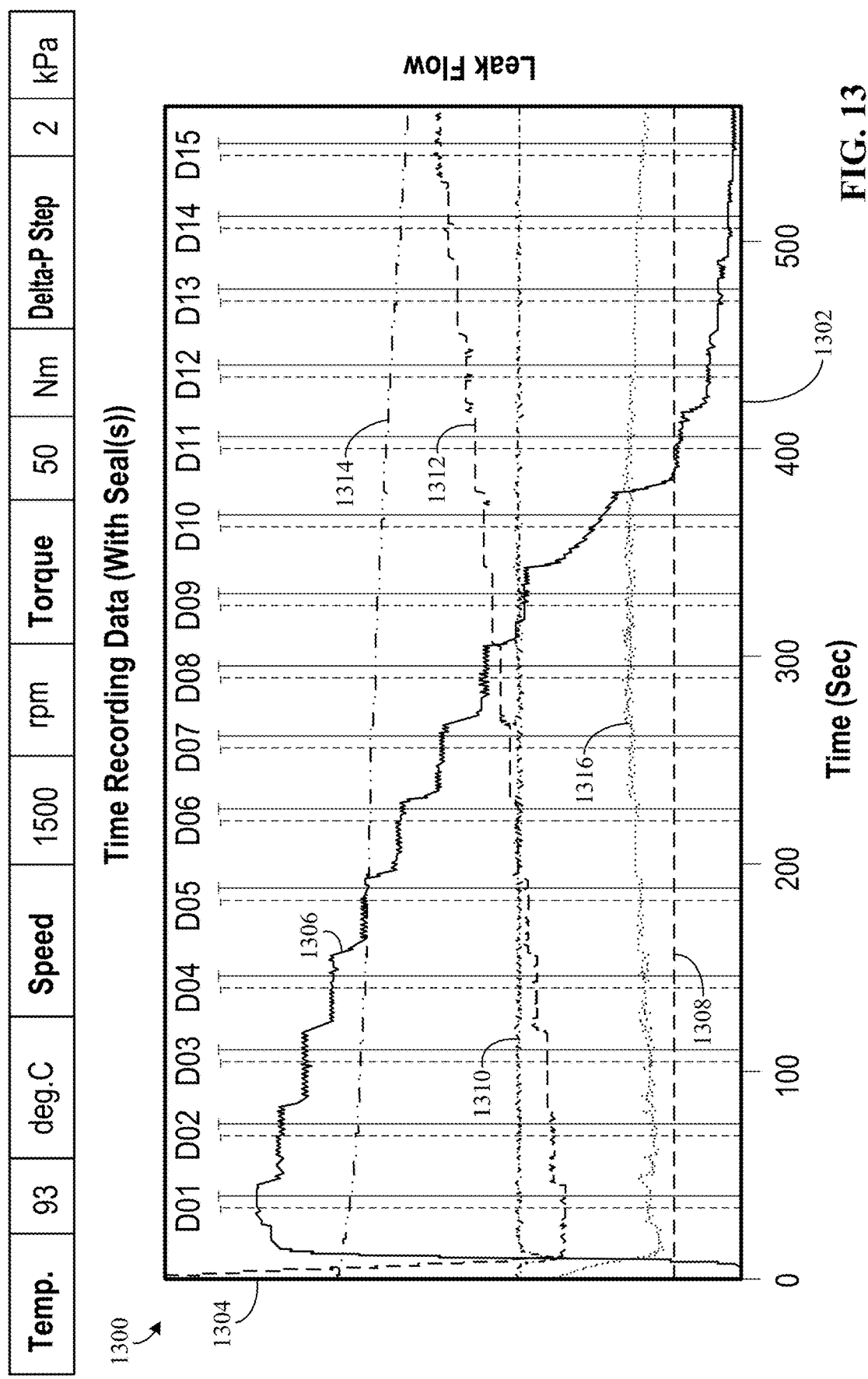

FIG. 13 illustrates a second graph 1300 showing example data associated with operation of the torque converter 200 of FIG. 3. According to the illustrated example of FIG. 13, the second graph 1300 includes a first axis (e.g., an x-axis) 1302 that corresponds to time (e.g., in seconds). The second graph 1300 of FIG. 13 also includes a second axis (e.g., a y-axis) 1304, perpendicular to the first axis 1302, that corresponds to a magnitude or degree of a torque converter parameter such as, for example, one of (a) slip (e.g., in RPM) of the first clutch 312, (b) a speed (e.g., in RPM) of the engine 102, (c) a torque (e.g., in newton metres (Nm)) generated by the first clutch 312, (d) a differential fluid pressure (e.g., in kPa) applied to and/or experienced by the piston 302, (e) a Pi temperature (e.g., in degrees Celsius (° C.)), which represents a torque converter inlet oil temperature, or (f) a leak flow (e.g., in L/min) provided by the assembly 300 (e.g., via the orifice(s) 402 and/or the seal(s) 304, 306, 382, 902). In particular, the second graph 1300 corresponds to the lockup on operation of the torque converter 200 of FIG. 3 when the torque converter 200 is converted from a three-pass torque converter to a two-pass torque converter via at least one one-way seal 304, 306, 382, 902 of the assembly 300.

The second graph 1300 of FIG. 13 also includes a third plot 1306 corresponding to the slip of the first clutch 312 during the lockup on operation over time. The second graph 1300 of FIG. 13 also includes a fourth plot 1308 corresponding to the speed of the engine 102 during the lockup on operation over time, which is substantially constant (e.g., at about 100 RPM) in this example. The second graph 1300 of FIG. 13 also includes a fifth plot 1310 corresponding to the torque generated by the first clutch 312 during the lockup on operation over time, which is substantially constant in this example. The second graph 1300 of FIG. 13 also includes a sixth plot 1312 corresponding to the differential fluid pressure applied to and/or experienced by the piston 302 during the lockup on operation of over time. The second graph 1300 of FIG. 13 also includes a seventh plot 1314 corresponding to the Pi temp temperature during the lockup on operation over time. The second graph 1300 of FIG. 13 also includes an eighth plot 1316 corresponding to the leak flow provided by the assembly 300 during the lockup on operation over time.

Each of the plots 1306, 1308, 1310, 1312, 1314, 1316 of FIG. 13 is provided by increasing the pressure differential applied to and/or experienced by the piston 302 while the torque converter 200 is in operation. For example, the hydraulic system 110 and/or, more generally, the transmission system 104 of the vehicle 100 controls the fluid 314 to periodically increase the differential fluid pressure by about 2 kPa. Thus, the direction of each plot 1306, 1308, 1310, 1312, 1314, 1316 is from left to right in the orientation of FIG. 13.

Figure 14:
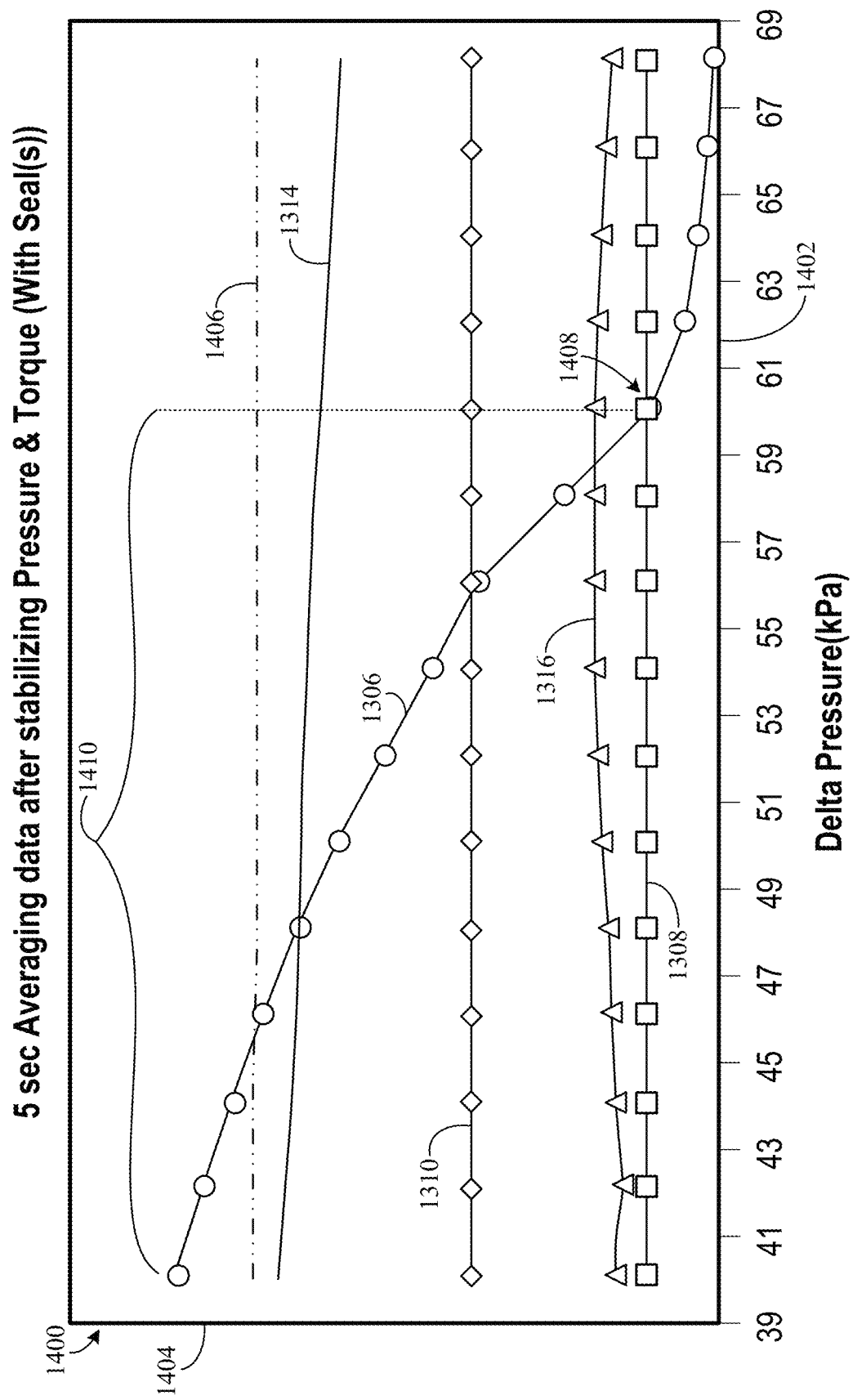

FIG. 14 illustrates a third graph 1400 showing example data associated with operation of the torque converter 200 of FIG. 3. In particular, the data shown by the third graph 1400 of FIG. 14 is based on the data shown by the second graph 1300 of FIG. 13. Thus, the third graph 1400 corresponds to the lockup on operation of the torque converter 200 of FIG. 3 when the torque converter 200 is implemented with at least one one-way seal 304, 306, 382, 902 of the assembly 300. The third graph 1400 of FIG. 14 includes a first axis (e.g., an x-axis) 1402 that corresponds the differential fluid pressure applied to and/or experienced by the piston 302 during the lockup on operation of the torque converter 200 (e.g., see the fourth plot 1312 of FIG. 13). Further, the third graph 1400 of FIG. 13 also includes a second axis (e.g., a y-axis) 1404, perpendicular to the first axis 1402, that corresponds to a magnitude or degree of a torque converter parameter, for example, one of (a) the slip (e.g., in RPM) of the first clutch 312, (b) the speed (e.g., in RPM) of the engine 102, (c) the torque (e.g., in Nm) generated by the first clutch 312, (d) a Pt temperature (e.g., in ° C.), which represents a torque converter outlet oil temperature, (e) the Pi temperature (e.g., in ° C.), or (f) the leak flow (e.g., in L/min) provided by the assembly 300.

The third graph 1400 of FIG. 14 also includes the third plot 1306 corresponding to the slip of the first clutch 312 during the lockup on operation, each data point of which has been averaged over five (5) seconds after a stabilizing differential fluid pressure and torque are achieved for the torque converter 200. The second graph 1300 of FIG. 13 also includes the fourth plot 1308 corresponding to the speed of the engine 102 during the lockup on operation, each data point of which has been averaged over five (5) seconds after the stabilizing differential fluid pressure and torque are achieved. The second graph 1300 of FIG. 13 also includes the fifth plot 1310 corresponding to the torque generated by the first clutch 312 during the lockup on operation, each data point of which has been averaged over five (5) seconds after the stabilizing differential fluid pressure and torque are achieved. The second graph 1300 of FIG. 13 also includes a ninth plot 1406 corresponding to the Pt temperature during the lockup on operation, each data point of which has been averaged over five (5) seconds after the stabilizing differential fluid pressure and torque are achieved. The second graph 1300 of FIG. 13 also includes the seventh plot 1314 corresponding to the Pi temp temperature during the lockup on operation over time, each data point of which has been averaged over five (5) seconds after the stabilizing differential fluid pressure and torque are achieved. The second graph 1300 of FIG. 13 also includes the eighth plot 1316 corresponding to the leak flow provided by the assembly 300 during the lockup on operation, each data point of which has been averaged over five (5) seconds after the stabilizing differential fluid pressure and torque are achieved.

According to the illustrated example of FIG. 14, the third plot 1306 includes a first inflection point 1408 corresponding to a particular differential fluid pressure, for example, that is about 60 kPa. To the left (in the orientation of FIG. 14) of the first inflection point 1408, the third plot 1306 has a substantially constant, slight slope defined by the slip of the first clutch 312 and the differential fluid pressure. That is, the slip of the first clutch 312 gradually decreases as the differential fluid pressure increases. Thus, the slip of the first clutch 312 is easily controlled across a first range 1410 of differential fluid pressures such as. For example, the first range 1410 is between about 41 kPa and about 60 kPa.

Figure 15:
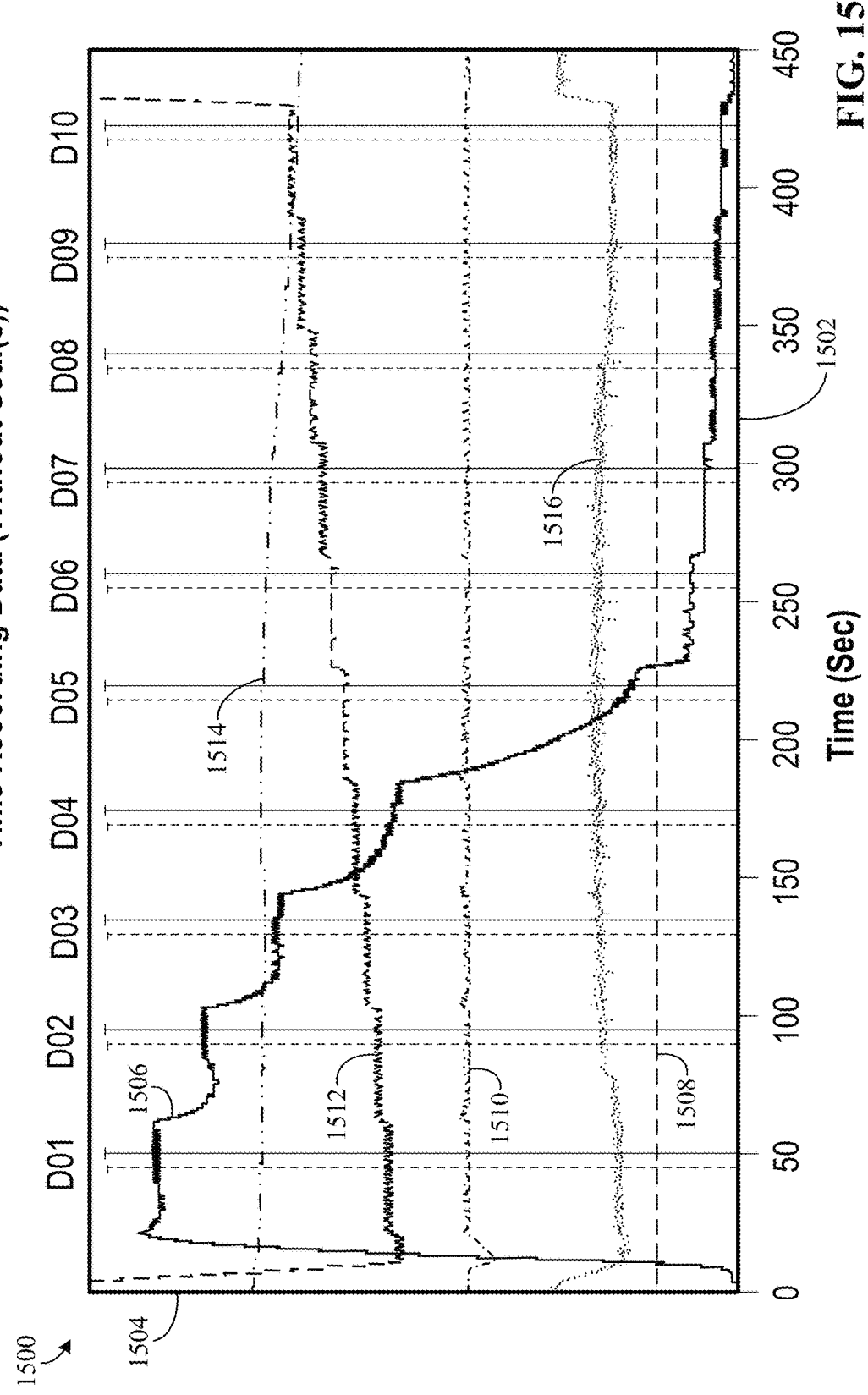

FIG. 15 illustrates a fourth graph 1500 showing example data associated with operation of the two-pass torque converter mentioned above in connection with FIG. 12. According to the illustrated example of FIG. 15, the fourth graph 1500 includes a first axis (e.g., an x-axis) 1502 that corresponds to time (e.g., in seconds). The fourth graph 1500 of FIG. 15 also includes a second axis (e.g., a y-axis) 1504, perpendicular to the first axis 1502, that corresponds to a magnitude or degree of a torque converter parameter such as, for example, one of (a) slip (e.g., in RPM) of a lockup clutch of the two-pass torque converter, (b) a speed (e.g., in RPM) of the engine 102, (c) a torque (e.g., in Nm) generated by the lockup clutch, (d) a differential fluid pressure (e.g., kPa) applied to and/or experienced by a piston of the lockup clutch, (e) a Pi temperature (e.g., in ° C.), or (f) a leak flow (e.g., in L/min) provided by the two-pass torque converter (i.e., without the assembly 300).

The fourth graph 1500 of FIG. 15 also includes a tenth plot 1506 corresponding to the slip of the clutch during a lockup on operation of the two-pass torque converter over time. The fourth graph 1500 of FIG. 15 also includes an eleventh plot 1508 corresponding to the speed of the engine 102 during the lockup on operation over time. The fourth graph 1500 of FIG. 15 also includes a twelfth plot 1510 corresponding to the torque generated by the lockup clutch during the lockup on operation over time. The fourth graph 1500 of FIG. 15 also includes a thirteenth plot 1512 corresponding to a differential fluid pressure applied to and/or experienced by a piston of the lockup clutch during the lockup on operation of over time. The fourth graph 1500 of FIG. 13 also includes a fourteenth plot 1514 corresponding to the Pi temp temperature during the lockup on operation over time. The fourth graph 1500 of FIG. 15 also includes a fifteenth plot 1516 corresponding to the leak flow provided by the two-pass torque converter during the lockup on operation over time.

Figure 16:
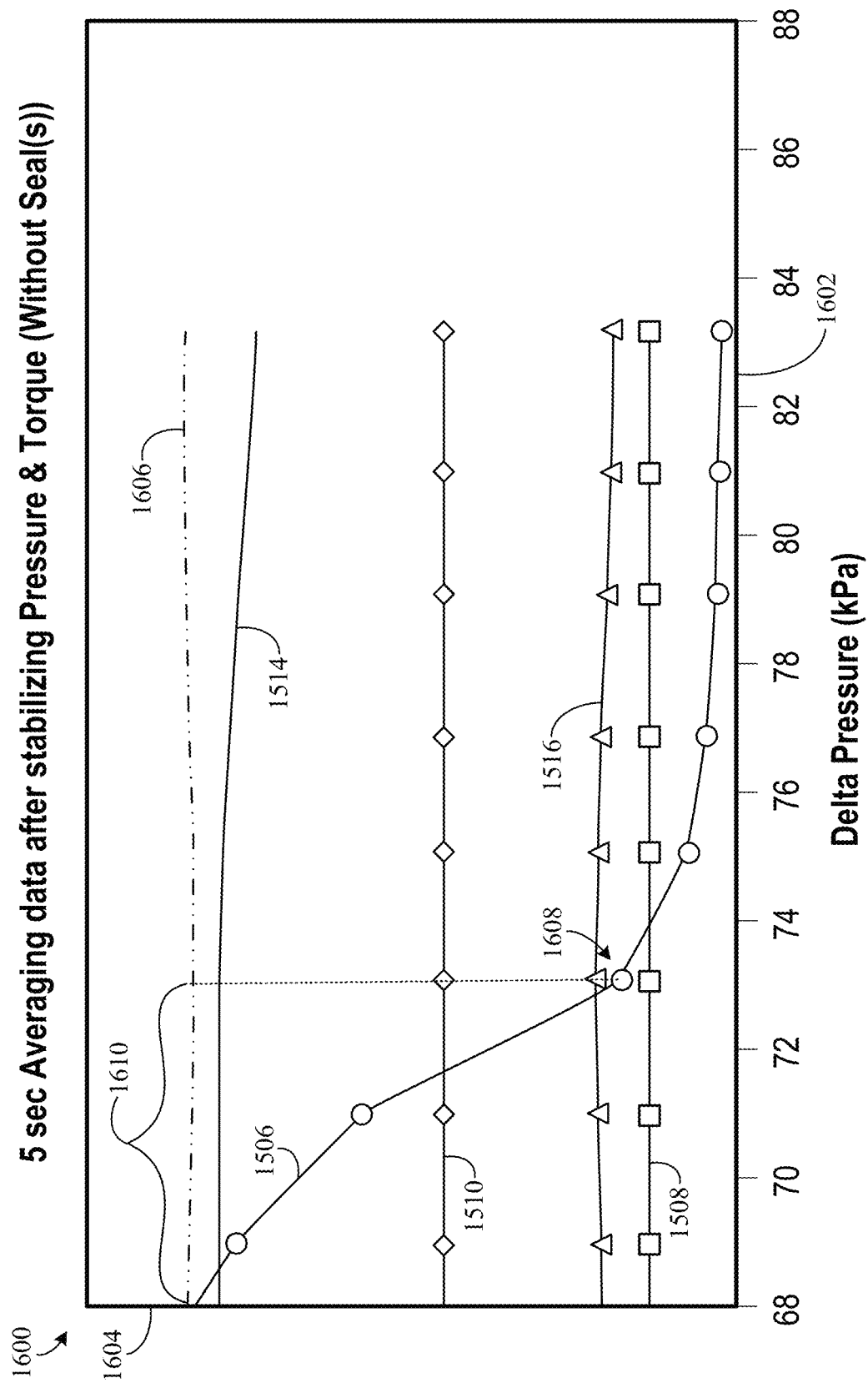

FIG. 16 illustrates a fifth graph 1600 showing example data associated with operation of the two-pass torque converter mentioned above in connection with FIG. 12. In particular, the data shown by the fifth graph 1600 of FIG. 16 is based on the data shown by the fourth graph 1500 of FIG. 15. Thus, the fifth graph 1600 corresponds to the lockup on operation of the two-pass torque converter. The fifth graph 1600 of FIG. 16 includes a first axis (e.g., an x-axis) 1602 that corresponds the differential fluid pressure applied to and/or experienced by the piston of the lockup clutch during the lockup on operation (e.g., see the thirteenth plot 1512 of FIG. 15). Further, the fifth graph 1600 of FIG. 16 also includes a second axis (e.g., a y-axis) 1604, perpendicular to the first axis 1602, that corresponds to a magnitude or degree of a torque converter parameter, for example, one of (a) the slip (e.g., in RPM) of the lockup clutch, (b) the speed (e.g., in RPM) of the engine 102, (c) the torque (e.g., in Nm) generated by the lockup clutch, (d) a Pt temperature (e.g., in ° C.), (e) the Pi temperature (e.g., in ° C.), or (f) the leak flow (e.g., in L/min) provided by the two-pass torque converter (i.e., with the assembly 300).

The fifth graph 1600 of FIG. 16 also includes the tenth plot 1506 corresponding to the slip of the first clutch 312 during the lockup on operation, each data point of which has been averaged over five (5) seconds after a stabilizing differential fluid pressure and torque are achieved for the two-pass torque converter. The fifth graph 1600 of FIG. 16 also includes the eleventh plot 1508 corresponding to the speed of the engine 102 during the lockup on operation, each data point of which has been averaged over five (5) seconds after the stabilizing differential fluid pressure and torque are achieved. The fifth graph 1600 of FIG. 16 also includes the twelfth plot 1510 corresponding to the torque generated by the lockup clutch during the lockup on operation, each data point of which has been averaged over five (5) seconds after the stabilizing differential fluid pressure and torque are achieved. The fifth graph 1600 of FIG. 13 also includes a sixteenth plot 1606 corresponding to the Pt temperature during the lockup on operation, each data point of which has been averaged over five (5) seconds after the stabilizing differential fluid pressure and torque are achieved. The fifth graph 1600 of FIG. 16 also includes the fourteenth plot 1514 corresponding to the Pi temp temperature during the lockup on operation over time, each data point of which has been averaged over five (5) seconds after the stabilizing differential fluid pressure and torque are achieved. The second graph 1300 of FIG. 13 also includes the fifteenth plot 1516 corresponding to the leak flow provided by two-pass torque converter during the lockup on operation (i.e., without the assembly 300), each data point of which has been averaged over five (5) seconds after the stabilizing differential fluid pressure and torque are achieved.

According to the illustrated example of FIG. 16, the tenth plot 1506 includes a second inflection point 1608 corresponding to a particular differential fluid pressure, for example, that is about 71 kPa. To the left (in the orientation of FIG. 16) of the second inflection point 1608, the third plot 1306 has a slope, defined by the slip of the lockup clutch and the differential fluid pressure, that is not constant and/or relatively steep. That is, the slip of the lockup clutch suddenly decreases with relatively small increases in the differential fluid pressure. Thus, compared to the first clutch 312, the slip of the lockup clutch is not easily controlled across a second range 1610 of differential fluid pressures such as, for example, between about 68 kPa and about 73 kPa. Additionally, the second range 1610 is substantially smaller than the first range 1410.

As used herein, the terms "Including" and "comprising" (and all forms and tenses thereof) are to be open ended terms. Thus, whenever a claim employs any form of "include" or "comprise" (e.g., comprises, includes, comprising, including, has, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended.

It will be appreciated that the apparatus, systems, and methods disclosed in the foregoing description provide numerous advantages. Examples disclosed herein convert a vehicle torque converter for use with a transmission system that would have otherwise been unattainable. Additionally, disclosed examples improve performance of a torque converter clutch, by means of one or more seals and/or one or more orifices associated with a clutch piston, while reducing complexity of related hydraulic controls.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A vehicle torque converter, comprising:
    a housing;
    a clutch including a piston in the housing, the piston having a first side partially defining a first chamber and a second side, opposite the first side, partially defining a second chamber;
    a first seal operatively coupled to the piston;
    a second seal operatively coupled to the piston; and
    an orifice positioned on the piston radially inward relative to a clutch pack of the clutch, wherein:
    the orifice is configured to provide a flow of a fluid between the first and second chambers during a lockup on operation of the vehicle torque converter to lubricate the clutch, and
    the first seal and the second seal are each a one-way seal.

2. The vehicle torque converter of claim 1, wherein:
    the piston includes a face that is positioned at a first radius relative to an axis of the vehicle torque converter, the face configured to engage a clutch plate, and
    the orifice is positioned at a second radius relative to the axis less than the first radius.

3. The vehicle torque converter of claim 1, wherein the fluid flows across the first and second seals between the first and second chambers during a lockup off operation to circulate the fluid through the housing and a vehicle transmission system.

4. The vehicle torque converter of claim 1, wherein the first seal is positioned at or adjacent a distal portion of the piston relative to an axis of the vehicle torque converter and the second seal is positioned at or adjacent a proximal portion of the piston relative to an axis of the vehicle torque converter that is opposite the distal portion.

5. The vehicle torque converter of claim 1, wherein the orifice is configured to limit a rate of the flow during the lockup on operation.

6. The vehicle torque converter of claim 5, wherein the rate is between 0.3 liters per minute and 1.5 liters per minute.

7. The vehicle torque converter of claim 1, wherein the orifice is a first orifice, further including one or more other orifices positioned on the piston and radially distributed relative to an axis associated with the vehicle torque converter.

8. A vehicle torque converter, comprising:
    a housing;
    a clutch including a piston in the housing, the piston having a first side partially defining a first chamber and a second side, opposite the first side, partially defining a second chamber;
    a first seal operatively coupled to the piston; and
    a second seal operatively coupled to the piston,
    wherein:
    the first seal or the second seal is configured to provide a flow of a fluid between the first and second chambers during a lockup on operation of the vehicle torque converter to lubricate the clutch, and
    the fluid flows across the first or second seal between the first and second chambers during a lockup off operation of the vehicle torque converter to circulate the fluid through the housing and a vehicle transmission system.

9. The vehicle torque converter of claim 8, wherein the first seal is configured to limit a rate of the flow during the lockup on operation.

10. The vehicle torque converter of claim 9, wherein the rate is between 0.3 liters per minute and 1.5 liters per minute.

11. The vehicle torque converter of claim 8, wherein the second seal is movable in a seal groove positioned on a component of the vehicle torque converter, a fluid seal formed by the second seal to change based on a position of the second seal relative to the seal groove.

12. The vehicle torque converter of claim 11, wherein the component includes the hub, further including a fluid channel extending through the hub to the seal groove, the seal groove fluidly coupling the fluid channel to the first and second chambers, movement of the first seal based on a flow direction of the fluid through the fluid channel.

13. The vehicle torque converter of claim 12, wherein the fluid channel extends along a linear path and is angled relative to an axis of the vehicle torque converter.

14. The vehicle torque converter of claim 8, further including an elastic member interposed between the first seal and a first side of a component defining a seal groove positioned on the component of the vehicle torque converter, a fluid seal formed by the first seal to change based on a position of the first seal relative to the seal groove, wherein the elastic member is configured to urge the first seal away from the first side toward a second side of the component defining the seal groove opposite the first side.

15. The vehicle torque converter of claim 14, further including a protrusion positioned on a side the first seal, the protrusion configured to engage a side of the component defining the seal groove.

16. The vehicle torque converter of claim 12, wherein the second seal is interposed between the piston and the hub.

17. The vehicle torque converter of claim 8, wherein the first seal is interposed between the piston and a portion of a clutch pack.

18. The vehicle torque converter of claim 12, wherein the first seal is interposed between the piston and a plate that is positioned on the hub, the plate extending away from the hub radially outward relative to an axis associated with the vehicle torque converter.

19. A vehicle torque converter, comprising:
a housing;
a clutch including a balance plate and piston that are in the housing and movably coupled together, the balance plate and the piston defining a first chamber, the piston and a cover defining a second chamber, the balance plate and an impeller defining a third chamber;
a one-way seal operatively coupled to the piston or the balance plate; and
an orifice positioned on the balance plate, the orifice configured to provide a flow of a fluid between the first and third chambers during a lockup on operation of the vehicle torque converter.

\* \* \* \* \*